United States Patent
Isono

(10) Patent No.: US 9,863,447 B2
(45) Date of Patent: Jan. 9, 2018

(54) MASTER CYLINDER AND MASTER CYLINDER DEVICE

(71) Applicant: Hiroshi Isono, Mishima (JP)

(72) Inventor: Hiroshi Isono, Mishima (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 386 days.

(21) Appl. No.: 14/434,806

(22) PCT Filed: Nov. 7, 2012

(86) PCT No.: PCT/JP2012/078832
§ 371 (c)(1),
(2) Date: Apr. 10, 2015

(87) PCT Pub. No.: WO2014/073051
PCT Pub. Date: May 15, 2014

(65) Prior Publication Data
US 2015/0285273 A1  Oct. 8, 2015

(51) Int. Cl.
*B60T 11/18* (2006.01)
*F15B 11/08* (2006.01)
(Continued)

(52) U.S. Cl.
CPC ............ *F15B 11/08* (2013.01); *B60T 7/042* (2013.01); *B60T 11/16* (2013.01); *B60T 11/18* (2013.01); *B60T 11/224* (2013.01); *B60T 13/143* (2013.01)

(58) Field of Classification Search
CPC .... B60T 13/686; B60T 13/662; B60T 13/745; B60T 7/042; B60T 13/48; B60T 11/224; B60T 11/16; B60T 13/143; B60T 11/18
See application file for complete search history.

(56) References Cited

U.S. PATENT DOCUMENTS

| 4,852,351 A | 8/1989 | Price |
| 6,311,492 B1 | 11/2001 | Takayama et al. |

(Continued)

FOREIGN PATENT DOCUMENTS

| DE | 100 07 184 A1 | 8/2000 |
| EP | 0 276 060 A1 | 7/1988 |

(Continued)

OTHER PUBLICATIONS

U.S. Appl. No. 14/399,727, filed Nov. 7, 2014 in the name of Isono et al.

*Primary Examiner* — Nathaniel Wiehe
*Assistant Examiner* — Abiy Teka
(74) *Attorney, Agent, or Firm* — Oliff PLC

(57) ABSTRACT

An input piston connected to a brake pedal and an output piston which is moved forward to increase a hydraulic pressure in a pressure chamber are fitted to each other telescopically, and an engaging spring is provided between the input piston and the pressure chamber. The output piston is moved forward relative to the input piston by a hydraulic pressure in a rear chamber while compressing the engaging spring. Since a set load of the engaging spring is set at a small value, the output piston is moved forward relative to the input piston in an initial period of a braking operation, making it possible to reduce a stroke of the input piston which is required for a hydraulic pressure in brake cylinders to reach a first set pressure.

10 Claims, 13 Drawing Sheets

(51) Int. Cl.
*B60T 7/04* (2006.01)
*B60T 13/14* (2006.01)
*B60T 11/16* (2006.01)
*B60T 11/224* (2006.01)

(56) References Cited

U.S. PATENT DOCUMENTS

2001/0032464 A1  10/2001  Inoue et al.
2005/0236890 A1* 10/2005  Matsuno .............. B60T 8/4077
                                        303/114.1
2013/0263588 A1  10/2013  Yoshimoto et al.

FOREIGN PATENT DOCUMENTS

| GB | 2 148 431 A | 5/1985 |
| JP | 2008-024098 A | 2/2008 |
| WO | 2012/060238 A1 | 5/2012 |
| WO | 2013/175556 A1 | 11/2013 |

* cited by examiner

MASTER CYLINDER AND MASTER CYLINDER DEVICE

TECHNICAL FIELD

The present invention relates to a master cylinder included in a hydraulic braking system and to a master cylinder device including the master cylinder.

BACKGROUND ART

A master cylinder described in Patent Document 1 includes an input piston and a pressurizing piston arranged in a row in an axial direction. The pressurizing piston can be moved relative to the input piston by a hydraulic pressure in a rear chamber.

PRIOR ART DOCUMENT

Patent Document

Patent Document 1 (Japanese Patent Application Publication No. 2008-24098)

SUMMARY OF THE INVENTION

Object of the Invention

An object of the present invention is to reduce a stroke of an input piston with respect to a hydraulic pressure in a pressure chamber in a master cylinder.

Means for Achieving Object and Effects

A master cylinder according to the present invention is configured such that an input piston and an output piston are engaged with each other via an engaging member in a state in which forward movement of the output piston relative to the input piston is allowed.

Since the forward movement of the output piston relative to the input piston is allowed, a stroke of the output piston with respect to a stroke of the input piston can be made longer, thereby reducing the stroke of the input piston with respect to a hydraulic pressure in a pressure chamber (which corresponds to the stroke of the output piston).

Forms of the Invention

There will be described inventions recognized to be claimable in the present invention and features of the invention.

(1) A master cylinder, comprising:
an input piston configured to be moved forward due to an operation of a braking operation member;
an output piston provided on an axis coaxially with the input piston and configured to be moved forward to increase a hydraulic pressure in a pressure chamber defined in front of the output piston; and
an engaging portion configured to engage the input piston and the output piston with each other via at least one engaging member in a state in which forward movement of the output piston relative to the input piston in a direction of the axis is allowed.

The forward movement of the input piston is caused by the operation of the braking operation member. The input piston and the braking operation member are in most cases connected to each other via an operation rod, and a stroke of the braking operation member and a stroke of the input piston are usually in one-to-one correspondence. However, the connection of the braking operation member to the input piston is not essential, and the input piston and the braking operation member only need to be cooperated with each other in a state in which the input piston is moved forward due to the operation of the braking operation member.

The engaging portion engages the input piston and the output piston with each other via the engaging member, i.e., physically or mechanically, and an example of the engaging member is an elastic member.

(2) The master cylinder according to the above form (1), further comprising a rear chamber defined at a rear of a pressure receiving face of the output piston,
wherein the engaging portion is configured to engage the output piston and the input piston with each other in a state in which the forward movement of the output piston relative to the input piston is allowed by a hydraulic pressure in the rear chamber.

The pressure receiving face may be provided on a rear portion of the output piston and may be provided on an intermediate portion of the output piston.

(3) The master cylinder according to the above form (1) or (2), wherein the engaging portion comprises at least one elastic member, as the at least one engaging member, provided between the input piston and the output piston.

The output piston is moved forward relative to the input piston (that is, the output piston is relatively moved forward with respect to the input piston) while elastically deforming the elastic member, and the output piston is returned by, e.g., the resilience of the elastic member to a relative position which is a position in a non-operating state.

The elastic member is elastically deformable by a force in the direction of the axis, and examples of the elastic member include a rubber and a spring. In the case where a plurality of the elastic members are provided, the plurality of elastic members may be arranged in line and may be arranged in parallel. In the case where the elastic member is a spring, the elastic member is preferably provided in an orientation in which the elastic member extends in the direction of the axis.

It is noted that the elastic force of the elastic member acts on the input piston and the output piston, that is, the elastic force is what is called an internal force. Thus, the elastic force does not affect an external force and does not affect a relationship among the hydraulic pressure in the pressure chamber, a braking operation force, and the hydraulic pressure in the rear chamber.

(4) The master cylinder according to any one of the above forms (1) through (3), wherein a plurality of engaging springs as the at least one engaging member are provided between the output piston and the input piston and arranged in line so as to extend in the direction of the axis, and at least two of the plurality of engaging springs differ from each other in spring constant.

(5) The master cylinder according to any one of the above forms (1) through (4), wherein a plurality of engaging springs as the at least one engaging member are provided between the output piston and the input piston and arranged in line so as to extend in the direction of the axis, and at least two of the plurality of engaging springs differ from each other in set load.

In the case where the plurality of engaging springs arranged in line, the engaging spring having a small set load is compressed first, and the engaging spring having a large set load is then compressed. In the case where the engaging spring having the small spring constant is compressed, an increase gradient of the hydraulic pressure in the pressure chamber with respect to a change in stroke of the forward movement of the output piston relative to the input piston is small, and in the case where the engaging spring having the large spring constant is compressed, the increase gradient of the hydraulic pressure in the pressure chamber is large.

In view of the above, in the case where the plurality of engaging springs are arranged in line, designing a set load and a spring constant of each of the plurality of engaging springs can achieve a desired relationship between the stroke of the input piston and the brake hydraulic pressure.

It is noted that two, or three or more engaging springs may be provided.

(6) The master cylinder according to the above form (4) or (5), wherein the engaging portion comprises a retainer provided between adjacent two of the plurality of engaging springs, and the retainer is movable relative to at least one of the input piston and the output piston in the direction of the axis.

The construction in which the retainer is interposed between the adjacent engaging springs improves extension and compression of the engaging springs.

(7) The master cylinder according to any one of the above forms (1) through (6), wherein the engaging portion comprises a relative forward movement amount definer configured to define an amount of the forward movement of the output piston relative to the input piston.

Defining the amount of relative movement can achieve a desired relationship between the stroke of the input piston and the stroke of the output piston.

The relative forward movement amount definer defines the amount of relative movement of the output piston relative to the input piston and defines an amount of elastic deformation of the elastic member. An example of the relative forward movement amount definer is a stopper.

(8) The master cylinder according to any one of the above forms (1) through (7),
wherein the input piston and the output piston are fitted telescopically to each other, and
wherein the engaging portion comprises a telescopic fitting portion in which the input piston and the output piston are fitted telescopically to each other.

The input piston and the output piston are fitted to each other such that the input piston and the output piston can be extended and compressed, that is, a length between a back end of the input piston and a forward end of the output piston (a total length of the two pistons) can be made longer and shorter. When the output piston is moved forward relative to the input piston, the total length of the two pistons is increased (the length of the telescopic fitting portion is reduced), while when the output piston is moved backward relative to the input piston, the total length of the two pistons is reduced (the length of the telescopic fitting portion is increased).

(9) The master cylinder according to any one of the above forms (1) through (8), wherein at least a portion of the output piston is disposed in a state in which: the at least the portion is formed in a blind cylinder shape in which a rear portion of the at least the portion is a bottom portion, and a front portion of the at least the portion is a cylindrical portion; an axial direction hole extending in the direction of the axis is formed in a center of the bottom portion; the input piston extends through the axial direction hole fluid-tightly and slidably; and a portion of the input piston is located on an inner circumferential side of the cylindrical portion of the output piston.

The output piston may entirely or partly have the blind cylinder shape. For example, the blind cylinder portion may be provided at a rear portion of the output piston and may be provided at an intermediate portion of the output piston.

The input piston may be disposed in a state in which its front portion is located on an inner circumferential side of the output piston and may be disposed in a state in which its intermediate portion is located on an inner circumferential side of the output piston.

(10) The master cylinder according to the above form (9),
wherein a volume chamber is defined on an inner circumferential side of the cylindrical portion of the output piston, and
wherein the volume chamber is isolated from a rear chamber and the pressure chamber and communicates with a reservoir.

The input piston is shaped generally like a rod and fluid-tightly and slidably extends through the axial direction hole formed in the bottom portion of the output piston. This construction allows the output piston and the input piston to be moved relative to each other. The volume chamber provided on the inner circumferential side of the cylindrical portion of the output piston is isolated from the rear chamber defined at a rear of the bottom portion of the output piston and from the pressure chamber defined in front of the output piston and communicates with the reservoir. This construction allows a change in volume of the volume chamber in accordance with the movement of the output piston relative to the input piston.

It is noted that the volume chamber may be defined by the output piston and the input piston.

(11) The master cylinder according to any one of the above forms (1) through (10), wherein the engaging portion engages the output piston and the input piston with each other such that one of (a) a state in which the output piston is movable forward relative to the input piston and (b) a state in which the input piston and the output piston are movable forward together is allowed to be selectively established.

(12) The master cylinder according to any one of the above forms (1) through (11), wherein the engaging portion comprises (a) an operating force transmitter configured to transmit, to the output piston, a forward force which is applied to the input piston by an operating force applied to the braking operation member and (b) a rear hydraulic pressure transmitter configured to transmit, to the input piston, a forward force which is applied to the output piston by a hydraulic pressure in a rear chamber.

Examples of the state in which the input piston and the output piston are movable forward together include (i) a case where the input piston and the output piston are moved forward by an operating force applied to the braking operation member (hereinafter abbreviated as "braking operation force"), (ii) a case where the input piston and the output piston are moved forward by the hydraulic pressure in the rear chamber, and (iii) a case where the input piston and the output piston are moved forward by both of the braking operation force and the hydraulic pressure in the rear chamber. In any case, it is possible to consider that a pressurizing piston is constituted by the input piston and the output piston. Also, even in the event of a malfunction in which the hydraulic pressure cannot be supplied to the rear chamber, the operating force transmitter can advance the input piston and the output piston together using the braking operation force, making it possible to generate a hydraulic pressure in the pressure chamber.

(13) The master cylinder according to any one of the above forms (9) through (12), wherein the engaging portion comprises (a) a retainer provided on the input piston and a stopper provided at a rear of the retainer in the direction of the axis and (b) an elastic member provided between the retainer provided on the input piston and a bottom portion of the output piston.

The output piston is moved forward relative to the input piston while elastically deforming the elastic member, but after the output piston is brought into contact with the stopper provided on the input piston, the input piston and the output piston are moved forward together by at least the hydraulic pressure in the rear chamber. In view of the above, it is possible to consider that the rear hydraulic pressure transmitter is constituted by, e.g., the stopper.

The retainer and the stopper are usually provided at a portion of the input piston which extends through the bottom portion of the output piston.

(14) The master cylinder according to any one of the above forms (9) through (13), wherein the engaging portion comprises a stopper provided on an inner circumferential side of the cylindrical portion of the output piston, and the input piston is contactable with a rear portion of the stopper.

The input piston and the output piston can be moved forward together by at least the braking operation force in a state in which the input piston is held in contact with the stopper of the output piston from a rear side thereof. In view of the above, it is possible to consider that the operating force transmitter is constituted by, e.g., the stopper.

(15) The master cylinder according to any one of the above forms (1) through (14), further comprising a forward movement suppressing portion configured to suppress forward movement of the input piston which is caused by the forward movement of the output piston relative to the input piston.

The forward movement suppressing portion can be called a backward force applying portion configured to apply a backward force to the input piston.

(16) The master cylinder according to the above form (15), wherein the forward movement suppressing portion comprises a return spring provided between a front portion of the input piston and a housing.

(17) The master cylinder according to the above form (16), wherein the engaging portion comprises at least one engaging spring provided between the input piston and the output piston, and a set load of at least one of the at least one engaging spring is less than a set load of the return spring.

A return spring (an output-side return spring) is in most cases provided between the output piston and the housing. In the master cylinder according to this form, however, the return spring is provided between the input piston and the housing. In the case where the return spring is provided between the output piston and the housing, the output piston cannot be moved forward relative to the input piston even when a force acting on the output piston exceeds the set load of the engaging spring in a period in which the force acting on the output piston is smaller than the set load of the return spring. Also, increasing the set load of the return spring is not preferable because a delay in brake working is deteriorated. In contrast, in the construction in which the return spring is provided between the input piston and the output piston, and the set load of the engaging spring is set to a smaller value, the output piston can be moved forward relative to the input piston earlier (even in the case where the hydraulic pressure in the rear chamber is low, for example). Also, the set load of the return spring can be set to a larger value, and the forward movement of the output piston relative to the input piston can be reliably started in a state in which the input piston is located at its back end position.

It is preferable to provide a backward force transmitter for transmitting a backward force acting on the input piston, to the output piston. In the construction in which the backward force transmitter is provided, in the case where the braking operation is released, the input piston is moved backward by the output-side return spring, which moves the output piston backward. The relative forward movement amount definer functions as the backward force transmitter in some cases.

(18) The master cylinder according to any one of the above forms (15) through (17), wherein the forward movement suppressing portion comprises a return spring provided between the housing and one of the input piston and a member movable in the direction of the axis together with the input piston.

The return spring (an input-side return spring) of the input piston suppresses the forward movement of the input piston. The input-side return spring urges the input piston in the backward direction.

(19) The master cylinder according to any one of the above forms (15) through (18), wherein the forward movement suppressing portion comprises a reaction force applying member configured to apply a reaction force related to an operating force of the braking operation member, to the input piston.

The reaction force applied to the input piston also suppresses the forward movement of the input piston.

The input piston may have a rear hydraulic pressure receiving face for receiving the hydraulic pressure in the rear chamber and may have a master hydraulic pressure receiving face for receiving the hydraulic pressure in the pressure chamber. The rear hydraulic pressure receiving face and the master hydraulic pressure receiving face may directly face the rear chamber and the pressure chamber, respectively, and may indirectly face the rear chamber and the pressure chamber, respectively, with another component interposed therebetween. Also, the master cylinder may be configured such that in the case where the hydraulic pressure can be supplied to the rear chamber, the reaction force is applied via the rear hydraulic pressure receiving face, and in the case where the hydraulic pressure cannot be supplied to the rear chamber, the reaction force is applied via the master hydraulic pressure receiving face.

(20) The master cylinder according to any one of the above forms (1) through (19), wherein the engaging portion is configured to engage the input piston and the output piston with each other, in at least a portion of a period in which the input piston is moved from a back end position thereof to a forward end position thereof, in the state in which the forward movement of the output piston relative to the input piston is allowed.

The forward movement of the output piston relative to the input piston may be allowed throughout the period in which the input piston is moved from the back end position thereof to the forward end position thereof and may be allowed in a portion of the period. For example, by allowing the relative movement in an initial period of the braking operation, a first fill can be completed during a period in which the stroke of the input piston is small, making it possible to reduce an amount of the delay in brake working.

It is noted that a period in which the forward movement of the output piston relative to the input piston is allowed may be determined by, e.g., a magnitude of the set load of the engaging spring.

(21) The master cylinder according to any one of the above forms (1) through (20), wherein the engaging portion is configured to engage the input piston and the output piston with each other, in at least a portion of a period extending from a time point when the input piston is located at a back end position thereof to a time point when a hydraulic pressure in the pressure chamber reaches a set pressure, in the state in which the forward movement of the output piston relative to the input piston is allowed.

The set pressure (the hydraulic pressure in the pressure chamber, i.e., a hydraulic pressure in the brake cylinder) may be set at a hydraulic pressure which is higher than or equal to a hydraulic pressure at a completion of the first fill (a hydraulic pressure for filling a space between a brake rotating member and a friction member), for example. This construction can satisfactorily suppress the delay in brake working.

(22) The master cylinder according to any one of the above forms (1) through (21), further comprising a return spring provided between the output piston and a housing,
wherein the engaging portion comprises at least one engaging spring, as the at least one engaging member, provided between the output piston and the input piston, and a set load of at least one of the at least one engaging spring is less than or equal to a set load of the return spring.

(23) The master cylinder according to any one of the above forms (1) through (22), further comprising a return spring provided between the output piston and a housing,
wherein the engaging portion comprises at least one engaging spring, as the at least one engaging member, provided between the output piston and the input piston, and a set load of at least one of the at least one engaging spring is greater than a set load of the return spring.

During a period in which the force acting on the output piston is smaller than the set load of the return spring, the output piston cannot be moved forward relative to the input piston. That is, when the force acting on the output piston exceeds the set load of the return spring, the relative movement is allowed. On the other hand, in the case where the force acting on the output piston is larger than the set load of the return spring but smaller than the set load of the engaging spring, the output piston cannot be moved forward relative to the input piston.

In view of the above, by making the set load of the engaging spring smaller than or equal to the set load of the return spring, the output piston can be quickly advanced relative to the input piston in the case where the force acting on the output piston exceeds the set load of the return spring in the initial period of the braking operation.

In the case where the set load of the engaging spring is made larger than the set load of the return spring, the output piston can be moved forward relative to the input piston in a middle period of the braking operation, i.e., when the force acting on the output piston exceeds the set load of the engaging spring. In this case, the output piston and the input piston are moved forward together in the initial period of the braking operation.

The set load of the engaging spring can be determined as needed as described above, whereby it is possible to determine when the output piston is moved forward relative to the input piston, which can achieve a desired relationship between the stroke of the input piston and the hydraulic pressure in the pressure chamber.

(24) The master cylinder according to any one of the above forms (1) through (23),
wherein the input piston comprises (a) a first input piston and (b) a second input piston, and
wherein the first input piston is located nearer to the braking operation member than the second input piston, and the second input piston is engaged with the output piston via the engaging portion and movable relative to the first input piston.

The input piston is divided into the first input piston and the second input piston, and the second input piston can be moved forward relative to the first input piston in the direction of the axis.

(25) The master cylinder according to the above form (24),
wherein a pistons-interposing chamber is interposed between the first input piston and the second input piston, and
wherein the first input piston and the second input piston have a shape in which an amount of increase in volume occupied by the first input piston in the pistons-interposing chamber in a case where it is assumed that the first input piston is moved forward by a set stroke is greater than an amount of reduction in volume occupied by the second input piston in a case where it is assumed that the second input piston is moved forward by the set stroke.

When the forward force is applied to the first input piston in a state in which the pistons-interposing chamber is in a fluid-tight state (e.g., a state in which the pistons-interposing chamber is isolated from, e.g., the reservoir, and a change in volume is not allowed), the first input piston and the second input piston are moved forward such that the amount of increase in volume occupied by the first input piston in the hydraulic-pressure chamber and the amount of reduction in volume occupied by the second input piston are made equal to each other. The stroke of the forward movement of the second input piston is longer than that of the forward movement of the first input piston, so that the second input piston is moved relative to the first input piston.

For example, an effective pressure receiving area of the first input piston with respect to the pistons-interposing chamber may be made larger than an effective pressure receiving area of the second input piston with respect to the pistons-interposing chamber. The effective pressure receiving area is an area of a portion which actually receives the hydraulic pressure, and in the case where it is assumed that the first input piston and the second input piston are moved by the same set stroke, the effective pressure receiving area is a value obtained by dividing an amount q1 or q2 of change in volume by the set stroke (q1/s, q2/s).

The engagement between the first input piston and the second input piston via the pistons-interposing chamber is referred to as "input-piston-moving-away allowing engaging portion". In the input-piston-moving-away allowing engaging portion, the first input piston and the second input piston are not engaged with each other via the engaging member.

(26) The master cylinder according to the above form (25), wherein the first input piston and the second input piston are movable forward together in a state in which a change in volume of the pistons-interposing chamber is allowed, and the second input piston is moved forward relative to the first input piston in a state in which the change in volume of the pistons-interposing chamber is inhibited.

For example, a communication cut-off valve may be provided between the pistons-interposing chamber and the reservoir to switch a state of the pistons-interposing chamber between the volume change allowing state and the volume change inhibiting state using opening and closing of the communication cut-off valve.

Also, control of opening and closing the communication cut-off valve (duty control) can control an outflow flow rate of the working fluid from the pistons-interposing chamber, which can control a relationship between a stroke of the first input piston and a stroke of the second input piston. The communication cut-off valve may be an electromagnetic open/close valve or a linear valve.

(27) A master cylinder device, comprising:
the master cylinder according to any one of the above forms (2) through (26);
a rear hydraulic pressure control device configured to control a hydraulic pressure in the rear chamber,
wherein the rear hydraulic pressure control device comprises (a) a power hydraulic pressure source configured to be activated by supply of electric power and capable of outputting a hydraulic pressure at high pressure and (b) a hydraulic pressure controller configured to use a hydraulic pressure provided by the power hydraulic pressure source, to bring the hydraulic pressure in the rear chamber closer to a target hydraulic pressure.

Since the master cylinder device includes the power hydraulic pressure source, the hydraulic pressure can be supplied to the rear chamber even when the braking operation member is not operated by a driver, making it possible to generate a hydraulic pressure in the pressure chamber. Also, it is possible to consider that a hydraulic booster is constituted by, e.g., the rear hydraulic pressure control device and the rear chamber.

In the case where the target hydraulic pressure is determined based on an operation state such as the operating force and the operating stroke of the braking operation member, the target hydraulic pressure is preferably determined at a value which is larger in the initial period of the braking operation and in a middle period of the braking operation. For example, the target hydraulic pressure may be set to increase with a gradient larger than the increase gradient of the braking operation force (for example, it is possible to consider that a gain is increased) and may be determined at a value greater than or equal to a predetermined set pressure. By quickly increasing the hydraulic pressure in the rear chamber in the initial period of the braking operation as described above, the output piston can be quickly moved forward relative to the input piston, which can increase the hydraulic pressure in the pressure chamber.

(28) A master cylinder device, comprising:
the master cylinder according to any one of the forms (2) through (26); and
a rear hydraulic pressure control device configured to control the hydraulic pressure in the rear chamber,
the rear hydraulic pressure control device comprising:
(a) a power hydraulic pressure source configured to be activated by supply of electric power and capable of outputting a hydraulic pressure at high pressure; and
(b) a regulator comprising:
 (i) a housing comprising at least an output port connected to the rear chamber, a high pressure port connected to the power hydraulic pressure source, and a low pressure port connected to a reservoir;
 (ii) a spool provided movably relative to the housing and capable of controlling a hydraulic pressure output from the output port, by fluidically coupling the output port selectively with one of the high pressure port and the low pressure port; and
 (iii) a spool moving device configured to move the spool to a non-pressure-increasing position at which the output port is isolated from the high pressure port when a force determined by an operation state of the braking operation member which acts on the spool becomes greater than or equal to a predetermined set value in a state in which the spool is located at a pressure increasing position at which the output port is isolated from the low pressure port and communicates with the high pressure port.

While the force determined by the operation state of the braking operation member is smaller than the set value, i.e., in the initial period of the braking operation, the spool is located at the pressure increasing position. Thus, the hydraulic pressure in the rear chamber can be increased with a large gradient.

(29) A master cylinder, comprising:
a housing;
a first piston and a second piston provided in the housing slidably and movably relative to each other in an axial direction; and
an engaging portion provided between the first piston and the second piston in a state in which increase and reduction in a length of the engaging portion between a back end of the first piston and a forward end of the second piston are allowed.

The technical feature according to any one of the above forms (1) through (28) may be employed for the master cylinder according to the present form.

(30) A master cylinder, comprising:
a housing;
a first piston and a second piston provided in the housing slidably and movably relative to each other in an axial direction; and
a relative movement limiter provided between the first piston and the second piston to limit an amount of relative movement of the first piston and the second piston.

The technical feature according to any one of the above forms (1) through (29) may be employed for the master cylinder according to the present form.

EMBODIMENTS OF THE INVENTION

Hereinafter, there will be described a hydraulic braking system including a master cylinder according to one embodiment of the present invention with reference to drawings. The present hydraulic braking system includes a master cylinder device according to one embodiment of the present invention.

Embodiment 1

Figure 1:
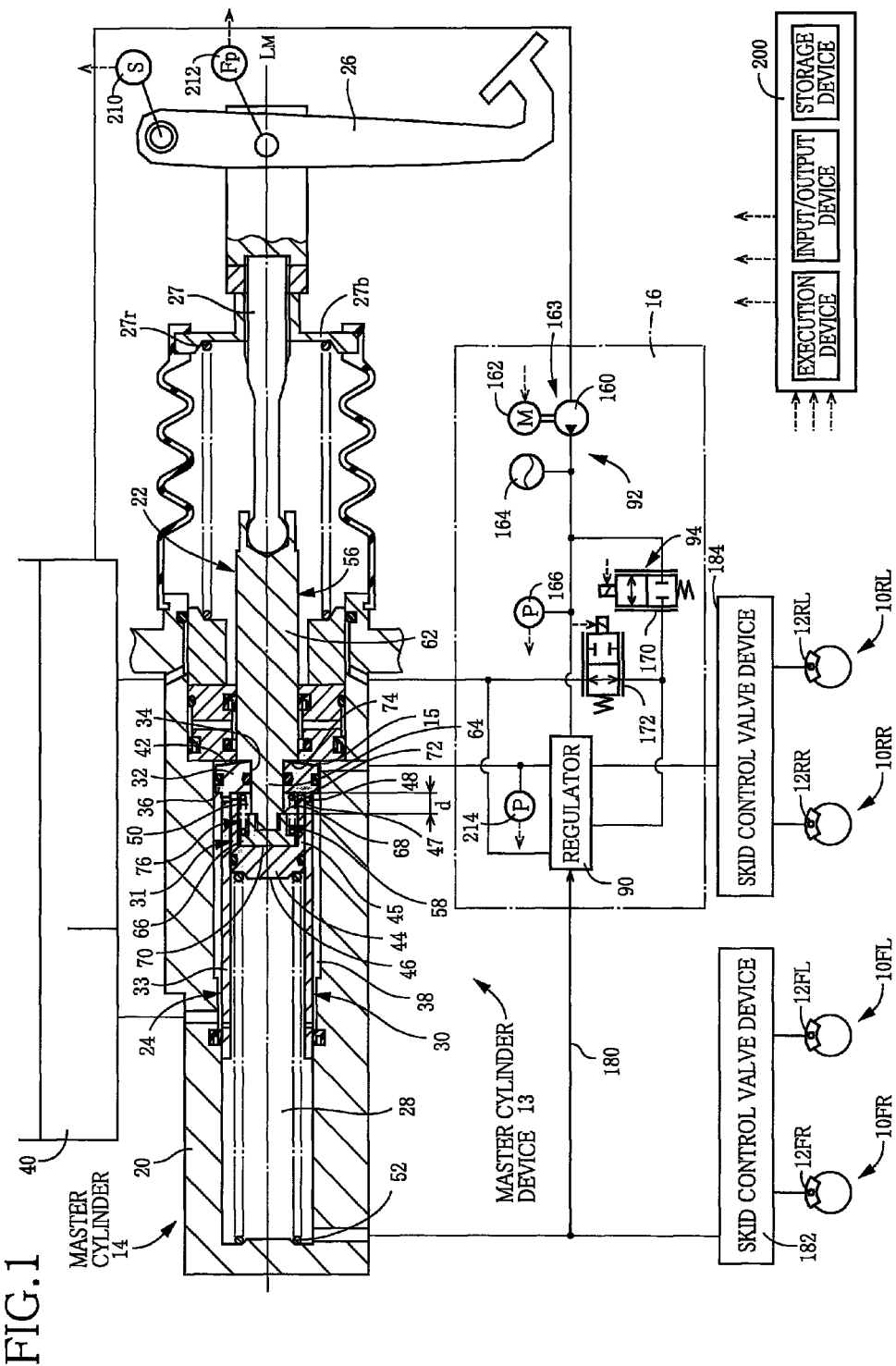
FIG. 1 is a view illustrating a hydraulic braking system including a master cylinder according to Embodiment 1 of the present invention, and the present hydraulic braking system includes a master cylinder device according to Embodiment 1 of the present invention.

The hydraulic braking system is provided on a vehicle, and as illustrated in FIG. 1, includes (i) brake cylinders 12FL, FR, RL, RR of respective hydraulic brakes respectively provided on front left and right and rear left and right wheels 10FL, FR, RL, RR and actuated by hydraulic pressures so as to restrain rotations of the respective wheels, and (ii) a master cylinder device 13. The master cylinder device 13 includes (a) a master cylinder 14 configured to supply a hydraulic pressure to the brake cylinders 12FL, FR provided for the respective front left and right wheels 10FL, FR and (b) an adjusted-hydraulic-pressure supply device 16, as a rear hydraulic pressure control device, configured to supply an adjusted hydraulic pressure to a rear chamber 15 formed in the master cylinder 14 and to the brake cylinders 12RL, RR provided for the respective rear left and right wheels 10RL, RR.

The master cylinder 14 includes (1) a housing 20 and (2) an input piston 22 and an output piston 24 fluid-tightly and slidably fitted in the housing 20. The input piston 22 and the output piston 24 are arranged on the same axis ($L_M$) and movable relative to each other in a direction of the axis ($L_M$). A brake pedal 26 as a braking operation member is connected to the input piston 22 via an operation rod 27, and the input piston 22 is moved forward by an operation of depressing the brake pedal 26. A return spring (an input-side return spring) 27r is provided between the housing 20 and a member 27b relatively movable in the axial direction integrally with the operation rod 27.

A pressure chamber 28 is defined in front of the output piston 24 and connected to the brake cylinders 12FL, FR provided for the respective front left and right wheels 10FL, FR.

A hydraulic pressure is supplied from the pressure chamber 28 formed in the master cylinder 14, to the brake cylinders 12FL, FR provided for the respective front left and right wheels, and a hydraulic pressure is supplied from the adjusted-hydraulic-pressure supply device 16 to the brake cylinders 12RL, RR provided for the respective rear left and right wheels. Thus, the present hydraulic braking system has front and rear lines.

The output piston 24 is constituted by a piston member 30 having a large diameter and a piston member 31 having a small diameter, each having a blind cylinder shape. These piston members 30, 31 are arranged one inside another in a state in which their respective bottom portions face each other in a radial direction. The piston members 30, 31 are fluid-tightly fitted to each other so as to be movable together with each other.

The large-diameter piston member 30 is disposed in a state in which its bottom portion 32 is located on a rear side, and its cylindrical portion 33 is located on a front side. A central portion of the bottom portion 32 has an axial direction hole 34 extending in the direction of the axis ($L_M$). The bottom portion 32 includes an annular outward protruding portion 36 protruding outward in the radial direction from an outer peripheral face of the cylindrical portion 33, and the bottom portion 32 is fluid-tightly and slidably fitted in the housing 20 at the annular outward protruding portion 36. An annular opposite chamber 38 is defined in front of the annular outward protruding portion 36 so as to communicate with a reservoir 40. The rear chamber 15 is defined at a rear of a rear side face 42 of the bottom portion 32.

The small-diameter piston member 31 is disposed in a state in which its bottom portion 44 is located on a front side, and its cylindrical portion 45 is located on a rear side. A front end face 46 of the bottom portion 44 faces the pressure chamber 28. A return spring (an output-side return spring) 52 is provided between the front end face 46 (or a retainer provided near the front end face 46) and the housing 20. The cylindrical portion 45 of the small-diameter piston member 31 is held in contact with the bottom portion 32 (a front side face) of the large-diameter piston member 30, so that a volume chamber 50 defined on an inner circumferential side of the output piston 24 communicates with the reservoir 40 via a through hole 47, a through hole 48, and an opposite chamber 38. The through hole 47 is formed in the cylindrical portion 45 in the radial direction, and the through hole 48 is formed in the cylindrical portion 33. Accordingly, a change in volume of the volume chamber 50 is allowed.

The input piston 22 is generally shaped like a rod and includes a stepped rod 56 and a stopper-function-provided retainer portion 58 fixed at a front end portion of the input piston 22. A rear portion of the stepped rod 56 is a large diameter portion 62, and a front portion of the stepped rod 56 is a small diameter portion 64. The small diameter portion 64 fluid-tightly and slidably extends through the axial direction hole 34 formed in the bottom portion 32 of the output piston 24 and is located inside the output piston 24, i.e., in the volume chamber 50.

The stopper-function-provided retainer portion 58 includes: a cylindrical portion having a diameter larger than that of the small diameter portion 64 of the stepped rod 56; and a flange portion 66 having a diameter larger than that of the cylindrical portion. A rear end face 68 of the cylindrical portion serves as a stopper, and a retainer is provided on a rear portion of the flange portion 66. A front end face 70 of the flange portion 66 can be brought into contact with a bottom face (a rear side face) of the bottom portion 44 of the output piston 24. It is noted that a distance d is a distance between the stopper 68 and a front side face of the bottom portion 32 in a state in which the input piston 22 and the output piston 24 are located at their respective back end positions. That is, the output piston 24 can be advanced relative to the input piston 22 by a stroke d. It is possible to consider that this stroke d is an amount of reduction in stroke of the input piston 22 and an amount of absorption of the stroke.

An engaging spring 72 as an engaging member is provided between the rear portion of the flange portion 66 of the input piston 22 and a front portion of the bottom portion 32 of the output piston 24.

A stepped face 74 between the large diameter portion 62 of the input piston 22 and the small diameter portion 64 faces the rear chamber 15. A hydraulic pressure in the rear chamber 15 acts on the rear hydraulic pressure receiving face 74 as the stepped face, whereby a reaction force of a braking operation force is applied to the input piston 22.

In the present embodiment, the output piston 24 and the input piston 22 are telescopically fitted on each other, and an engaging portion 76 is constituted by this telescopic structure, the stopper-function-provided retainer portion 58, the bottom portion 32, the engaging spring 72, the stopper 68, and so on.

Figure 2:
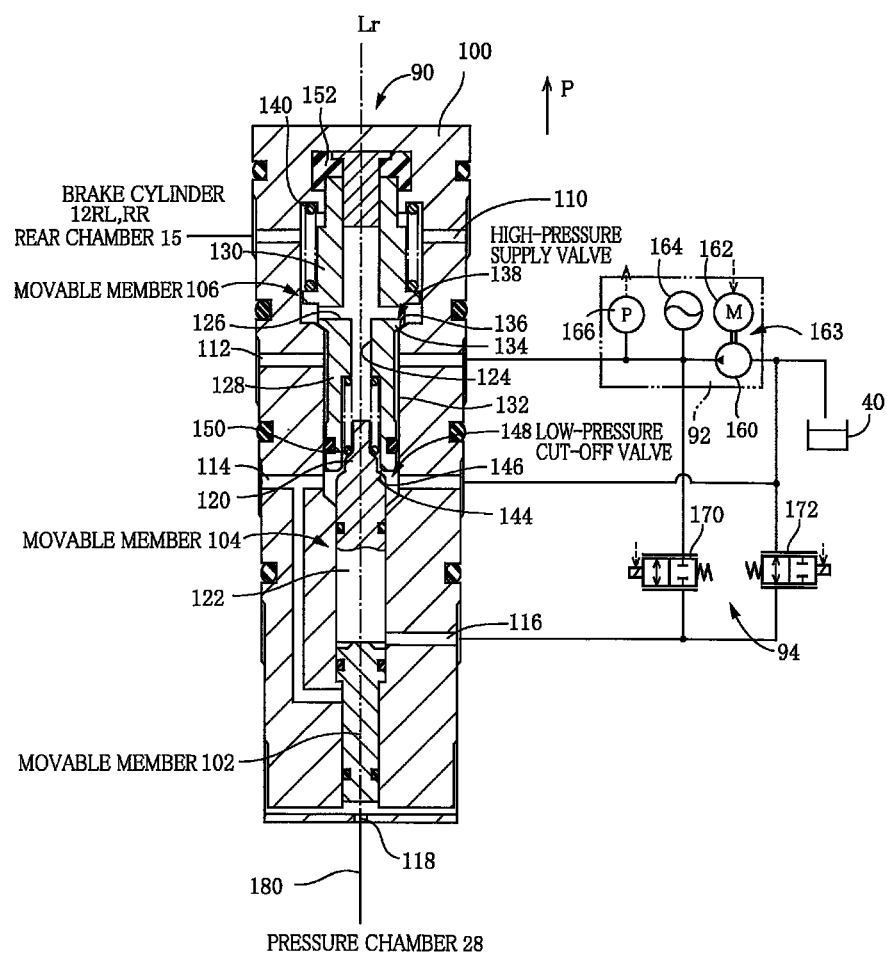
FIG. 2 is a cross-sectional view illustrating a regulator of an adjusted-hydraulic-pressure control device of the master cylinder device.

As illustrated in FIG. 2, the adjusted-hydraulic-pressure supply device 16 includes a regulator 90, a high pressure source 92, and a linear valve device 94.

Devices and components connected to the regulator 90 include: the rear chamber 15 and the brake cylinders 12RL, RR provided for the respective rear wheels 10RL, RR each as an adjusted hydraulic pressure supply target; the high pressure source 92; the linear valve device 94; and the reservoir 40. The linear valve device 94 controls the regulator 90 to control a hydraulic pressure to be supplied to the rear chamber 15 and the brake cylinders 12RL, RR, using a hydraulic pressure provided by the high pressure source 92 and working fluid stored in the reservoir 40.

The regulator 90 includes a housing 100 and movable members 102-106 arranged in line so as to be fluid-tightly and slidably fitted in the housing 100.

The housing 100 has an output port 110, a high pressure port 112, a low pressure port 114, a linear control-pressure port 116, and a pilot pressure port 118 formed spaced apart from each other in a direction of the axis (Lr). The output port 110 is connected to the rear chamber 15 and the brake cylinders 12RL, RR. The high pressure port 112 is connected to the high pressure source 92. The low pressure port 114 is connected to the reservoir 40. The linear control-pressure port 116 is connected to the linear valve device 94. The pilot pressure port 118 is connected to the pressure chamber 28.

The movable member 102 is movable by a hydraulic pressure in the pilot pressure port 118.

The movable member 104 has a stepped shape and includes a small diameter portion 120 and a large diameter portion 122. An end face of the large diameter portion 122 serves as a pressure receiving face which receives a hydraulic pressure in the linear control-pressure port 116, i.e., a hydraulic pressure controlled by the linear valve device 94. The movable member 104 is movable by this hydraulic pressure controlled by the linear valve device 94.

The movable member 106 has an axial direction passage 124 and an output passage 126 as a radial passage which communicate with each other. The output passage 126 communicates with the output port 110. The movable member 106 has a stepped shape and includes a small diameter portion 128 and a large diameter portion 130. An annular groove portion 132 is formed in an outer peripheral face of the small diameter portion 128 so as to extend in a direction parallel with the axis Lr. This annular groove portion 132 communicates with the high pressure port 112. A high-pressure supply valve 138 is constituted by a step (a valve member) 134 between the small diameter portion 128 and the large diameter portion 130, and a step (a seat) 136 provided on the housing 100. Opening and closing the high-pressure supply valve 138 fluidically couple and isolate the annular groove portion 132 and the output port 110 with and from each other, selectively. The high-pressure supply valve 138 is urged to its closed state by a spring 140 provided between the movable member 106 and the housing 100.

The small diameter portion 120 of the movable member 104 is located inside the axial direction passage 124 of the movable member 106, and a low-pressure cut-off valve 148 is constituted by a step (a valve member) 144 between the small diameter portion 120 and the large diameter portion 122 of the movable member 104, and an opening edge portion (a seat) 146 of the axial direction passage 124 of the movable member 106. Opening and closing the low-pressure cut-off valve 148 fluidically couple and isolate the low pressure port 114 and the output port 110 with and from each other, selectively. The low-pressure cut-off valve 148 is urged to its open state by a spring 150 provided between the movable member 104 and the movable member 106.

It is noted that an elastic member (e.g., a rubber member) 152 is provided between the housing 100 and one of opposite end portions of the movable member 106 which is farther from the movable member 104 than the other end portion. Elastic deformation of the elastic member 152 allows movement of the movable member 106 in the direction indicated by the arrow P (i.e., movement for switching the high-pressure supply valve 138 to its open state).

The high pressure source 92 includes: a pump device 163 including a pump (a plunger pump) 160 and a pump motor 162; an accumulator 164; and an accumulator pressure sensor 166 configured to detect a hydraulic pressure in the accumulator 164, i.e., a hydraulic pressure in the high pressure port 112. The pump motor 162 is controlled such that the accumulator pressure is kept within a set range.

The linear valve device 94 includes: a pressure-increase linear valve 170 provided between the high pressure source 92 and the linear control-pressure port 116; and a pressure-reduction linear valve 172 provided between the linear control-pressure port 116 and the reservoir 40. Each of the pressure-increase linear valve 170 and the pressure-reduction linear valve 172 is capable of controlling a high-low pressure differential to a magnitude related to an amount of current supplied to a solenoid. The pressure-increase linear valve 170 is a normally closed valve which is kept in its closed state when no current is supplied to the solenoid. The pressure-reduction linear valve 172 is a normally open valve which is kept in its open state when no current is supplied to the solenoid. By controlling the pressure-increase linear valve 170 and the pressure-reduction linear valve 172, the hydraulic pressure in the linear control-pressure port 116 is controlled to a desired magnitude.

The pressure chamber 28 is connected to the pilot pressure port 118 via a fluid passage 180.

A skid control valve device 182 is provided between the pressure chamber 28 and the brake cylinders 12FL, FR provided for the respective front left and right wheels. A skid control valve device 184 is provided between the output port 110 and the brake cylinders 12RL, RR provided for the respective rear left and right wheels. In the present embodiment, the hydraulic pressures of generally the same magnitude are respectively supplied to the brake cylinders 12FL, FR provided for the respective front wheels and the brake cylinders 12RL, RR provided for the respective rear wheels, but even in the case where the hydraulic pressure cannot be supplied to the brake cylinders 12RL, RR provided for the respective rear wheels due to, e.g., a malfunction in an electrical system and/or a malfunction in the adjusted-hydraulic-pressure supply device 16, a manual operation for the master cylinder 14 generate a hydraulic pressure in the pressure chamber 28, so that the hydraulic pressure is supplied to at least the brake cylinders 12FL, FR provided for the respective front wheels, thereby actuating the hydraulic brakes provided on the respective front wheels.

The hydraulic braking system includes a brake ECU 200 (see FIG. 1) constituted mainly by a computer. Devices connected to the brake ECU 200 include: the accumulator pressure sensor 166; a stroke sensor 210 configured to detect an operating stroke of the brake pedal 26; an operating-force sensor 212 configured to detect an operating force acting on the brake pedal 26; an output sensor 214 configured to detect a hydraulic pressure in the output port 110; the linear valve device 94; and the pump motor 162. A storage device of the brake ECU 200 stores tables and a multiplicity of programs including a program for controlling the linear valve device 94.

There will be next explained operations of the present hydraulic braking system.

In a non-operating state of the brake pedal 26, the master cylinder 14 and the regulator 90 are located at their respective illustrated original positions. In the master cylinder 14, the input piston 22 and the output piston 24 are located at their respective back end positions, and the pressure chamber 28 communicates with the reservoir 40. In the regulator 90, the high-pressure supply valve 138 is in its closed state, the low-pressure cut-off valve 148 is in its open state, and the output port 110 communicates with the reservoir 40. Each of the rear chamber 15 and the brake cylinders 12RL, RR provided for the respective rear wheels communicates with the reservoir 40.

When the brake pedal 26 is depressed, the adjusted hydraulic pressure is supplied from the adjusted-hydraulic-pressure supply device 16 to the rear chamber 15 and the brake cylinders 12RL, RR provided for the respective rear wheels 10RL, RR.

In the adjusted-hydraulic-pressure supply device 16, current supplied to the solenoid of the linear valve device 94 is controlled such that the adjusted hydraulic pressure, i.e., the hydraulic pressure output from the output port 110 is brought closer to a target hydraulic pressure determined based on, e.g., the operating stroke and the operating force of the brake pedal 26. By controlling the hydraulic pressure in the linear control-pressure port 116, the high-pressure supply valve 138 and the low-pressure cut-off valve 148 are opened and closed, whereby the hydraulic pressure in the output port 110 is brought closer to the target hydraulic pressure.

In the master cylinder 14, the input piston 22 is moved forward when the braking operation force applied to the input piston 22 via the brake pedal 26 becomes larger than a set load of the input-side return spring 27r. While the braking operation force is smaller than the set load of the input-side return spring 27r, the forward movement of the input piston 22 is suppressed. In view of the above, it is possible to consider that the input-side return spring 27r is a forward movement suppressing portion which suppresses the forward movement of the input piston 22. Also, the hydraulic pressure in the rear chamber 15 as an operation reaction force acts on the rear hydraulic pressure receiving face 74 of the input piston 22.

In an initial period of the braking operation, the output piston 24 is moved forward relative to the input piston 22 by the hydraulic pressure in the rear chamber 15 while compressing the engaging spring 72 and the output-side return spring 52, and the output piston 24 is moved forward until the front side face of the bottom portion 32 is brought into contact with the stopper 68. The hydraulic pressure in the rear chamber 15 is controlled based on a brake operating state (which can be expressed as the stroke of the brake pedal 26 or foot power acting on the brake pedal 26, for example) in a state in which the output piston 24 is moved forward relative to the input piston 22. For example, the hydraulic pressure in the rear chamber 15 may be controlled such that the hydraulic pressure in the rear chamber 15 increases with a gradient greater than an increase gradient of the braking operation force applied to the input piston 22.

After the bottom portion 32 of the output piston 24 is brought into contact with the stopper 68, the output piston 24 and the input piston 22 are moved forward together by the braking operation force and a force which is related to the hydraulic pressure in the rear chamber 15 and received by a pressure receiving face (i.e., a portion defined by subtracting the area of the rear hydraulic pressure receiving face 74 from the area of the rear side face 42). The hydraulic pressure in the rear chamber 15 may be controlled based on the brake operating state such that the output piston 24 and the input piston 22 are movable together. A hydraulic pressure having a magnitude determined based on the braking operation force and a forward force related to the hydraulic pressure in the rear chamber 15 is generated in the pressure chamber 28 and supplied to the brake cylinders 12FL, FR provided for the respective front wheels.

It is noted that since the engaging spring 72 is provided between the input piston 22 and the output piston 24, an elastic force of the engaging spring 72 acts as an internal force. Accordingly, the elastic force of the engaging spring 72 never affects an external force, and even in the construction in which the engaging spring 72 is provided, a relationship among a hydraulic pressure in the pressure chamber 28, the hydraulic pressure in the rear chamber 15, and the braking operation force is maintained.

In the present embodiment, a set load of the engaging spring 72 is less than or equal to a set load of the output-side return spring 52. Accordingly, when a forward force applied to the output piston 24 by the hydraulic pressure in the rear chamber 15 exceeds the set load of the output-side return spring 52, the output piston 24 is moved forward relative to the input piston 22, allowing the output piston 24 to be speedily moved forward relative to the input piston 22 in the initial period of the braking operation, resulting in increase in the hydraulic pressure in the pressure chamber 28 with respect to the stroke of the input piston 22. For example, in a construction in which the output piston 24 is moved forward relative to the input piston 22 until the hydraulic pressure in the brake cylinders 12FL, FR reaches a first set pressure which is higher than or equal to a hydraulic pressure established at completion of a first fill, the stroke of the input piston 22, i.e., the brake pedal 26 which is required until the completion of the first fill can be reduced, whereby the hydraulic pressure in the brake cylinders 12FL, FR can be speedily increased to a hydraulic pressure which is higher than or equal to the hydraulic pressure at the completion of the first fill, making it possible to satisfactorily suppress a delay in brake working.

It is noted that the hydraulic pressure in the rear chamber 15, i.e., the adjusted hydraulic pressure supplied from the adjusted-hydraulic-pressure supply device 16 is preferably made higher with respect to the operating state of the brake pedal 26 in the initial period of the braking operation than in a period after the initial period (i.e., after a regular-use range). For example, a gain with respect to the braking operation force in determination of a target hydraulic pressure in the rear chamber 15 may be made larger than a gain established after the regular-use range in the initial period of the braking operation. In the initial period of the braking operation, the hydraulic pressure in the rear chamber 15 may be increased with a gradient larger than the increase gradient of the braking operation force and may be determined to be higher than or equal to a set pressure. These constructions allow the output piston 24 to be speedily moved forward relative to the input piston 22 in the initial period of the braking operation.

The output piston 24 is moved forward relative to the input piston 22 until the output piston 24 is brought into contact with the stopper 68, that is, the output piston 24 is moved forward by the stroke d. Since the amount of relative movement is thus determined, it is possible to suppress occurrence of situation in which an operation feeling is deteriorated due to an excessively short stroke. Also, the determination of the stroke d allows free design of a relationship between the operating stroke of the brake pedal 26 and the hydraulic pressure in the brake cylinders 12FL, FR, thereby achieving a desired relationship.

Figure 3:
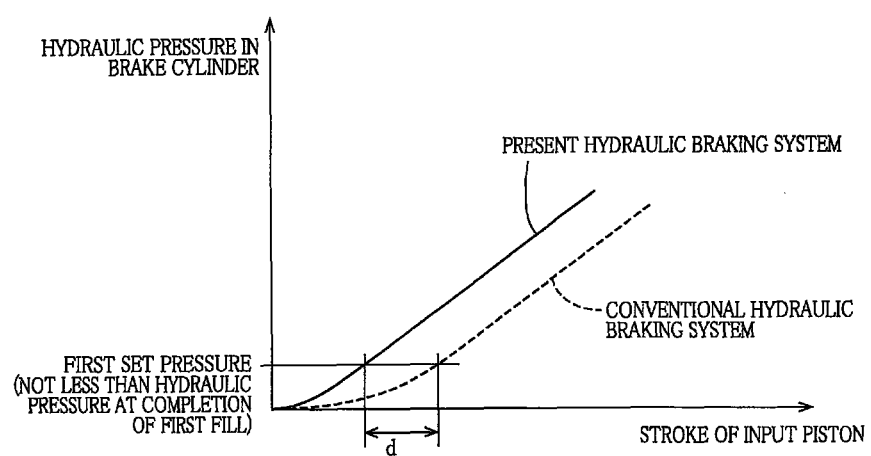
FIG. 3 is a view illustrating a relationship between a stroke of an input rod and a hydraulic pressure in a brake cylinder provided for a front wheel in the hydraulic braking system.

FIG. 3 illustrates a relationship between a stroke of the input piston 22 and a hydraulic pressure in the brake cylinders 12FL, FR provided for the respective front wheels in the present hydraulic braking system. In the conventional hydraulic braking system (not including the engaging portion 76), as indicated by the broken line, a long stroke of the input piston 22 is required before the hydraulic pressure in the brake cylinders 12FL, FR reaches the first set pressure (i.e., the hydraulic pressure higher than or equal to the hydraulic pressure at the completion of the first fill). In the present hydraulic braking system, in contrast, as indicated by the solid line, a shorter stroke of the input piston 22 is required before the hydraulic pressure in the brake cylinders 12FL, FR reaches the first set pressure.

It is noted that an amount of this reduction in the stroke corresponds to the amount d of relative movement. Thus, the engaging portion 76 may be referred to as "stroke absorbing mechanism".

When the operation for the brake pedal 26 is released, no current is supplied to the linear valve device 94 in the adjusted-hydraulic-pressure supply device 16, the movable members 102, 104, 106 are returned to their respective illustrated original positions. As a result, the output port 110 communicates with the reservoir 40, and the rear chamber 15 and the brake cylinders 12RL, RR provided for the respective rear wheels communicate with the reservoir 40.

Also, the output piston 24 is moved backward by the output-side return spring 52, so that the bottom portion 44 is brought into contact with the front end face 70 of the input piston 22. Thereafter, the output piston 24 and the input piston 22 are moved backward together. Also, the resilience of the engaging spring 72 returns the output piston 24 and the input piston 22 to their respective illustrated relative positions.

In the event of, e.g., a malfunction in the electrical system, in the adjusted-hydraulic-pressure supply device 16, no current is supplied to the linear valve device 94, and the linear control-pressure port 116 is fluidically coupled with the reservoir 40, but the hydraulic pressure in the pressure chamber 28 is supplied to the pilot pressure port 118, moving the movable member 102 in the direction indicated by the arrow P to move the movable member 104 and the movable member 106. The low-pressure cut-off valve 148 is switched to the closed state, and the high-pressure supply valve 138 to the open state. While the hydraulic pressure remains in the accumulator 164, it is possible to increase (adjust) the hydraulic pressures in the rear chamber 15 and the brake cylinders 12RL, RR provided for the respective rear wheels.

Also, even in case where the hydraulic pressure cannot be supplied from the accumulator 164, the manual operation for the master cylinder 14 can be performed. In the master cylinder 14, the front end face 70 of the input piston 22 is brought into contact with the bottom portion 44 of the output piston 24 (or the rear hydraulic pressure receiving face 74 is brought into contact with the bottom portion 32) by the operating force applied to the brake pedal 26, thereby advancing the input piston 22 and the output piston 24 together. A hydraulic pressure related to the braking operation force is generated in the pressure chamber 28 and supplied to the brake cylinders 12FL, FR provided for the respective front wheels. It is noted that in the adjusted-hydraulic-pressure supply device 16, the working fluid can be supplied from the reservoir 40 to the output port 110 by an operation of a check valve (suction and discharge valves) provided on the plunger pump 160.

In the present embodiment, the engaging portion 76 is a rear-hydraulic-pressure-dependent allowing portion and includes a telescopic fitting portion. A relative forward movement amount definer and a rear hydraulic pressure transmitter are constituted by, e.g., the stopper 68 and the bottom portion 32, and an operating force transmitter is constituted by, e.g., the front end face 70 and the bottom portion 44. The forward movement suppressing portion is constituted by, e.g., the rear hydraulic pressure receiving face 74 and the input-side return spring 27r.

It is noted that the structure of the adjusted-hydraulic-pressure supply device 16 is not limited to that in the above-described embodiment. For example, the regulator 90 has any structure. Also, providing the regulator is not essential. For example, the adjusted-hydraulic-pressure supply device 16 may be configured not to include the regulator but include the high pressure source 92 and the linear valve device 94. With this construction, in the event of, e.g., a malfunction in the electrical system, the reservoir 40 may communicate with the output port 110 to supply the working fluid from the reservoir 40 to the rear chamber 15. Also, the pressure-increase linear valve 170 may be a normally open valve.

The engaging portion 76 may have any structure. For example, a rubber may be provided instead of the engaging spring 72.

The master cylinder 14 may have two pressure chambers. However, the construction of the master cylinder 14 including one pressure chamber can achieve a shorter total length.

Embodiment 2

Figure 4:
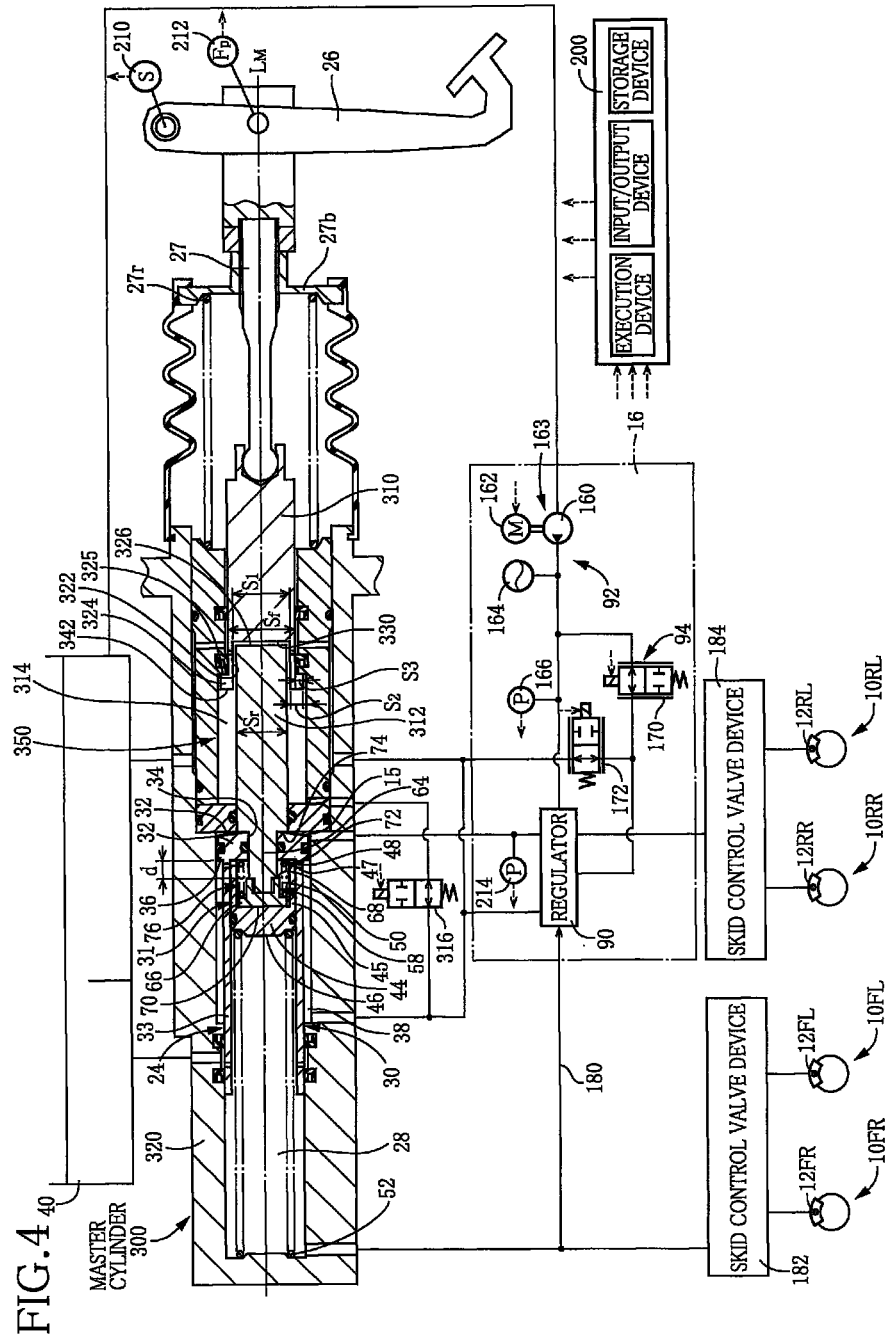
FIG. 4 is view illustrating a hydraulic braking system including a master cylinder according to Embodiment 2 of the present invention, and the present hydraulic braking system includes a master cylinder device according to Embodiment 2 of the present invention.

In the present embodiment, as illustrated in FIG. 4, a hydraulic braking system includes a master cylinder 300 which includes a first input piston 310 and a second input piston 312 instead of the input piston 22 in the master cylinder 14 according to Embodiment 1. The first input piston 310 and the second input piston 312 face each other in a pistons-interposing chamber 314, and a normally open electromagnetic open/close valve in the form of a communication cut-off valve 316 is provided between the pistons-interposing chamber 314 and the opposite chamber 38. Opening and closing of the communication cut-off valve 316 switch the pistons-interposing chamber 314 between a volume change allowing state in which the pistons-interposing chamber 314 communicates with the reservoir 40 via the opposite chamber 38 and a volume change inhibiting state in which the pistons-interposing chamber 314 is isolated from the reservoir 40. Since the other structure is generally the same as that of the hydraulic braking system in Embodiment 1, the same reference numerals as used in Embodiment 1 are used to designate the corresponding elements of this embodiment, and an explanation of which is dispensed with.

In the master cylinder 300, each of the first input piston 310 and the second input piston 312 is fluid-tightly and slidably fitted in a housing 320.

The first input piston 310 has: a rear portion to which the brake pedal 26 is connected via the operation rod 27; an intermediate portion fluid-tightly and slidably fitted in the housing 320; and a front portion having a recessed portion 322 opening frontward. A rear portion of the second input piston 312 is located in the recessed portion 322. An open end of the recessed portion 322 is provided with a flange 324 as a stopper protruding outward in the radial direction. Contact of a rear face 325 of the stopper 324 with the housing 320 defines a back end position of the first input piston 310. As in Embodiment 1, a front portion of the second input piston 312 is engaged with the output piston 24 via the engaging portion 76, and a rear end face 326 faces a bottom face 330 of the recessed portion 322 of the first input piston 310.

The area Sf of a facing face of the first input piston 310 which faces the pistons-interposing chamber 314 is an area obtained by subtracting the area S3 of the rear face 325 of the flange 324 from the sum of the area S1 of the bottom face 330 and the area S2 of a front end face 342 of the flange 324 (Sf=S1+S2−S3), and this area Sf is larger than the area Sr of the rear end face (which faces the pistons-interposing chamber 314) 326 of the second input piston 312 (Sf>Sr).

In the hydraulic braking system constructed as described above, when the brake pedal 26 is depressed, the closed state of the communication cut-off valve 316 is established. The pistons-interposing chamber 314 is isolated from the opposite chamber 38 and the reservoir 40 and thus switched to the volume change inhibiting state. While the first input piston 310 is moved forward by the operation of depressing the brake pedal 26, the second input piston 312 is moved forward such that an amount of increase in volume with the forward movement of the first input piston 310 and an amount of reduction in volume with the forward movement of the second input piston 312 are equal to each other in the pistons-interposing chamber 314. In the present embodiment, since the area Sr of the rear end face (the facing face) 326 of the second input piston 312 is smaller than the area Sf of the facing face of the first input piston 310 (Sr<Sf), a stroke of the second input piston 312 is longer than that of the first input piston 310, and the second input piston 312 is moved forward relative to the first input piston 310.

In the present embodiment as described above, an input-piston-moving-away allowing engaging portion 350 is provided to allow forward movement of the second input piston 312 relative to the first input piston 310 and forward movement of the output piston 24 relative to the second input piston 312, whereby a stroke of the output piston 24 can be made longer with respect to a stroke of the first input piston 310, and the stroke of the first input piston 310 can be made shorter with respect to the hydraulic pressure in the pressure chamber 28.

Figure 5:
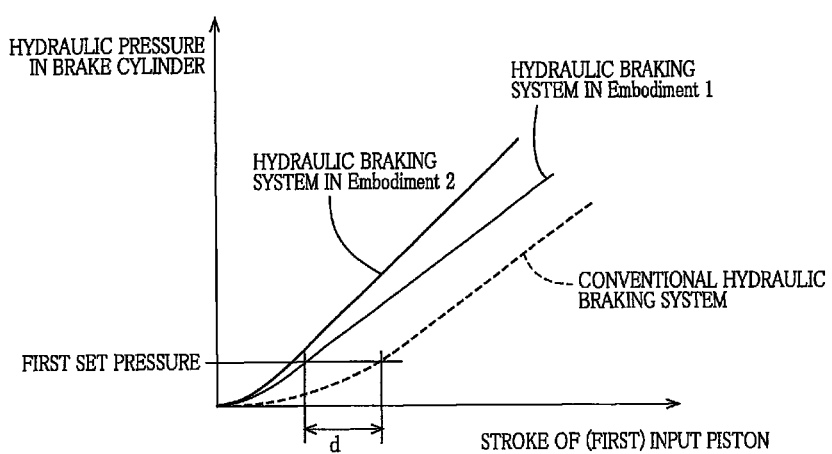
FIG. 5 is a view illustrating a relationship between a stroke of an input rod and a hydraulic pressure in a brake cylinder provided for a front wheel in the hydraulic braking system.

While the forward movement of the output piston 24 relative to the input piston 22 is allowed in the initial period of the braking operation in the engaging portion 76, the first input piston 310 is allowed to move forward throughout its stroke from the back end position to a forward end position of the first input piston 310 in the input-piston-moving-away allowing engaging portion 350. As a result, as indicated by the bold line in FIG. 5, the increase gradient of the hydraulic pressure in the brake cylinders 12FL, FR with respect to the stroke of the first input piston 310 can be made larger than that in Embodiment 1, and the stroke of the first input piston 310 can be reduced in the case where the hydraulic pressure in the brake cylinders 12FL, FR is the same.

While a forward force related to a hydraulic pressure in the pistons-interposing chamber 314 is applied to the second input piston 312, the hydraulic pressure in the pistons-interposing chamber 314 is of a magnitude related to the braking operation force. Thus, the output piston 24 and the second input piston 312 are moved forward together by a force related to the hydraulic pressure in the rear chamber 15 and received by the pressure receiving face of the output piston 24 and the force related to the hydraulic pressure in the pistons-interposing chamber 314 and received by the second input piston 312. A hydraulic pressure related to these forward forces is generated in the pressure chamber 28.

In the event of, e.g., a malfunction in the electrical system, the open state of the communication cut-off valve 316 is established. The pistons-interposing chamber 314 is fluidically coupled with the reservoir 40 and thus switched to the volume change allowing state. The bottom face 330 is brought into contact with the rear end face 326 by the operation of depressing the brake pedal 26, thereby advancing the first input piston 310 and the second input piston 312 together.

As described above, the communication cut-off valve 316 is the normally open valve, and accordingly in the event of a malfunction in the electrical system, the pistons-interposing chamber 314 is fluidically coupled with the reservoir 40. As a result, the operating force applied to the brake pedal 26 can be satisfactorily transmitted to the second input piston 312.

In the present embodiment as described above, the input-piston-moving-away allowing engaging portion 350 is constituted by, e.g., the pistons-interposing chamber 314, the communication cut-off valve 316, and the construction in which the area Sf of the front end face of the first input piston 310 is larger than the area Sr of the rear end face 326 of the second input piston 312. In the input-piston-moving-away allowing engaging portion 350 as described above, the first input piston 310 and the second input piston 312 are engaged with each other not mechanically (not by a solid engaging member) but by the hydraulic pressure.

Embodiment 3

A master cylinder of a hydraulic braking system in the present embodiment differs from the master cylinder 14 according to Embodiment 1 in structure of the engaging portion, but the other structure of the master cylinder according to the present embodiment is generally the same as that of the master cylinder 14, and an explanation of which is dispensed with.

Figure 6:
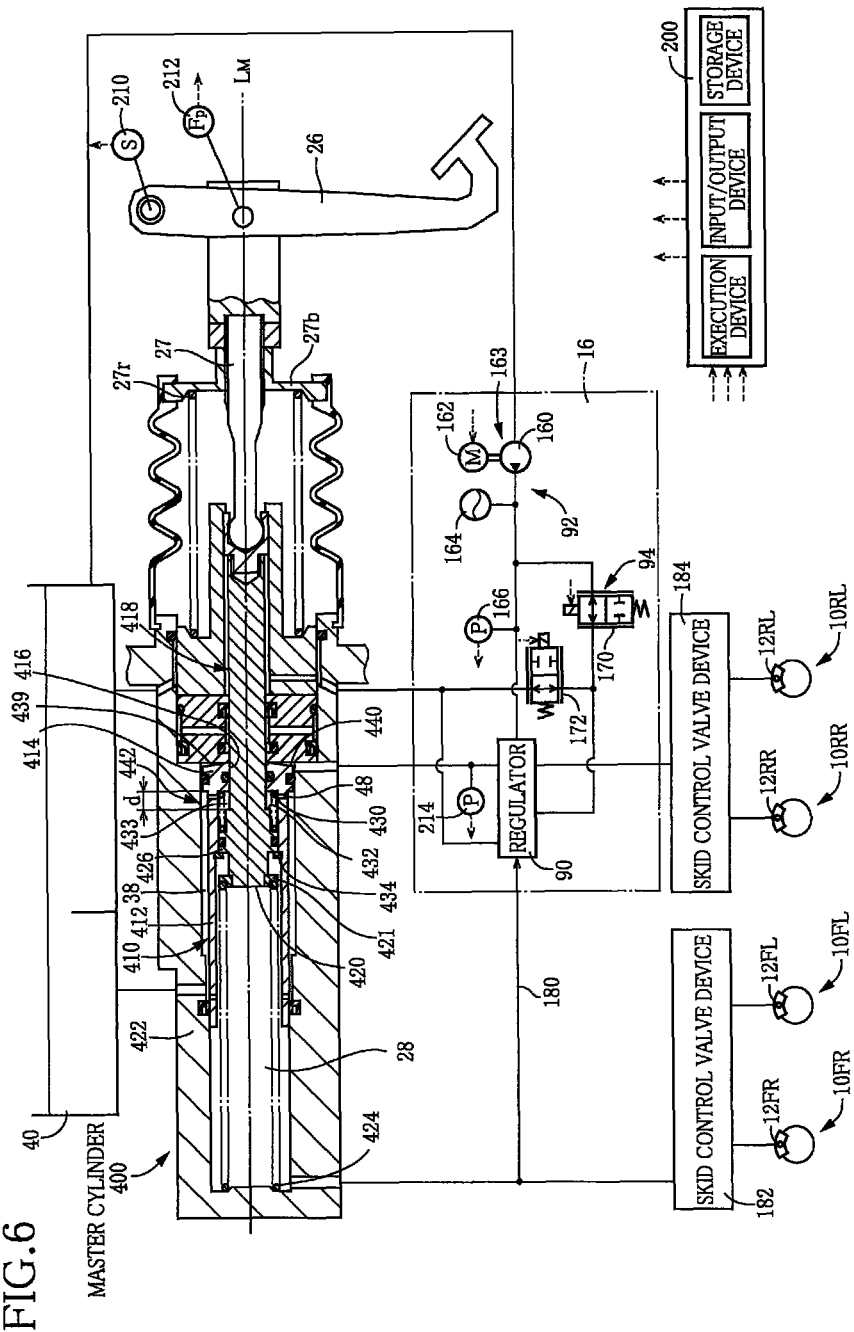
FIG. 6 is a view illustrating a hydraulic braking system including a master cylinder according to Embodiment 3 of the present invention, and the present hydraulic braking system includes a master cylinder device according to Embodiment 3 of the present invention.

A master cylinder 400 illustrated in FIG. 6 includes an output piston 410 having a blind cylinder shape. A front portion of the output piston 410 is a cylindrical portion 412, and a rear portion of the output piston 410 is a bottom portion 414. A central portion of the bottom portion 414 has an axial direction hole 416 through which an input piston 418 extends fluid-tightly and slidably. A front portion of the input piston 418 is located on an inner circumferential side of the cylindrical portion 412.

In the front portion of the input piston 418, a front end face 420 faces the pressure chamber 28, and a return spring (an output-side return spring) 424 is provided between a housing 422 and a retainer 421 provided on the front end face 420. An intermediate portion of the input piston 418 is provided with an annular outward protruding portion 426 protruding outward in the radial direction, and an outer circumferential portion of the annular outward protruding portion 426 is fluid-tightly and slidably fitted in an inner circumferential face of the cylindrical portion 412 of the output piston 410. A rear portion of the annular outward protruding portion 426 is provided with a retainer, and an engaging spring 430 is provided between the retainer and a front portion of the bottom portion 414 of the output piston 410. A stepped face 432 serving as a stopper is provided on a portion of the intermediate portion which is located at a rear of the annular outward protruding portion 426. In the present embodiment, a volume chamber 433 is defined between the annular outward protruding portion 426 of the input piston 418 and the bottom portion 414 of the output piston 410, and this volume chamber 433 communicates with the reservoir 40 via the through hole 48 and the opposite chamber 38. A set load of the engaging spring 430 is less than a set load of the output-side return spring 424.

An intermediate portion of the cylindrical portion 412 of the output piston 410 is provided with an annular inward protruding portion 434 protruding inward in the radial direction. A front side face of the annular outward protruding portion 426 of the input piston 418 is contactable with a rear side face of the annular inward protruding portion 434, and a rear side face of the retainer 421 of the input piston 418 is contactable with a front side face of the annular inward protruding portion 434.

A rear chamber 440 is defined at a rear of a pressure receiving face 439 as a rear side face of the bottom portion 414 of the output piston 410. In the present embodiment, since the input piston 418 does not have a facing face (a reaction force receiving face) facing the rear chamber 440, the rear side face of the bottom portion 414 is the pressure receiving face 439.

In the hydraulic braking system constructed as described above, when the brake pedal 26 is depressed, the adjusted hydraulic pressure is supplied to the rear chamber 440. When a forward force acting on the output piston 410 is made larger than the set load of the engaging spring 430 by a hydraulic pressure in the rear chamber 440 (even in the case where the forward force is smaller than the set load of the output-side return spring 424), the output piston 410 is moved forward relative to the input piston 418. Since the set load of the output-side return spring 424 is larger than the set load of the engaging spring 430, the output piston 410 can be moved forward before the input piston 418, that is, the output piston 410 can be moved forward in a state in which the input piston 418 is located at its back end position. Also, since the set load of the engaging spring 430 is set at a small value, even in the case where the hydraulic pressure in the rear chamber 440 is small, that is, just after a braking operation is started, the output piston 410 can be moved forward relative to the input piston 418, thereby increasing a brake hydraulic pressure.

The output piston 410 is moved forward relative to the input piston 418 while compressing the engaging spring 430, and when the bottom portion 414 is brought into contact with the stopper 432, the input piston 418 and the output piston 410 are moved together by the braking operation force and the hydraulic pressure in the rear chamber 440 which is received by the pressure receiving face 439.

It is noted that the input piston 22 receives a reaction force generated by the hydraulic pressure in the pressure chamber 28 and the output-side return spring 424.

When the operation for the brake pedal 26 is released, the hydraulic pressure is not supplied to the rear chamber 440, and the input piston 418 is moved backward by the return spring 424. When the retainer 421 is brought into contact with the annular inward protruding portion 434, or the stopper 432 is brought into contact with the bottom portion 414, the output piston 410 and the input piston 418 are moved backward together. Also, the resilience of the engaging spring 430 returns the relative positional relationship between the output piston 410 and the input piston 418 to the illustrated relationship.

In the present embodiment, an engaging portion 442 is constituted by, e.g., a portion in which the input piston 418 and the output piston 410 are telescopically fitted together, the engaging spring 430, the bottom portion 414, the annular outward protruding portion 426, the stopper 432, and the return spring 424.

A backward force transmitter is constituted by the retainer 421 and the annular inward protruding portion 434 or by the stopper 432 and the bottom portion 414.

Figure 7:
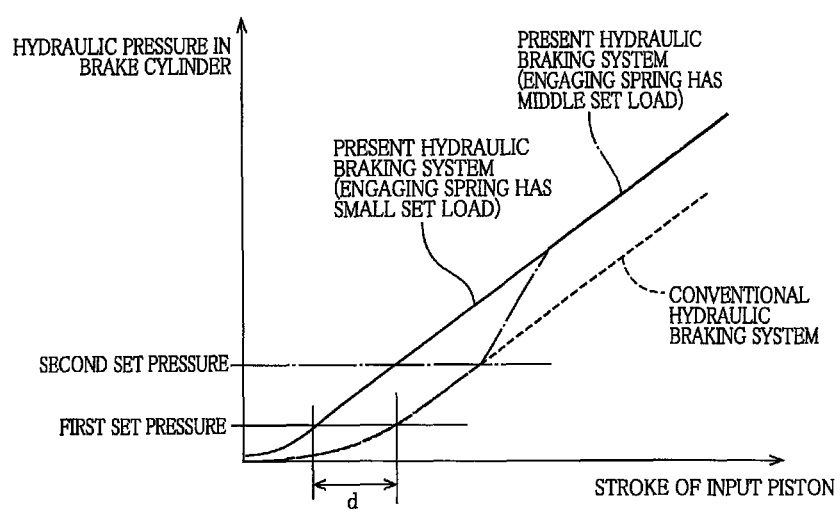
FIG. 7 is a view illustrating a relationship between a stroke of an input rod and a hydraulic pressure in a brake cylinder provided for a front wheel in the hydraulic braking system.

The solid line in FIG. 7 indicates a relationship between a stroke of the input piston 418 and a brake hydraulic pressure in the hydraulic braking system in the present embodiment. As indicated in the solid line, the brake hydraulic pressure can be speedily increased in the initial period of the braking operation, making it possible to satisfactorily suppress the delay in brake working.

By increasing the set load of the return spring 424 and reducing the set load of the engaging spring 430, the output piston 410 can also be moved forward in a state in which the input piston 418 is located at its back end position to generate a hydraulic pressure in the pressure chamber 28.

It is noted that in the case where the set load of the engaging spring 430 is increased to a value which is established when the hydraulic pressure in the pressure chamber 28 has reached a second set pressure higher than the first set pressure (i.e., a value related to the hydraulic pressure in the rear chamber 440 in the case where the hydraulic pressure in the pressure chamber 28 is equal to the second set pressure), the output piston 410 becomes movable forward relative to the input piston 418 after the hydraulic pressure in the pressure chamber 28 reaches the second set pressure (in the regular-use range) after the completion of the first fill. In this case, as indicated by the one-dot chain line in FIG. 7, an increase gradient of the brake hydraulic pressure with respect to the stroke increases from a middle period of the braking operation.

In the present embodiment as described above, the set load and the spring constant of the engaging spring 430 may be designed so as to achieve a desired brake feeling.

Embodiment 4

Figure 8:
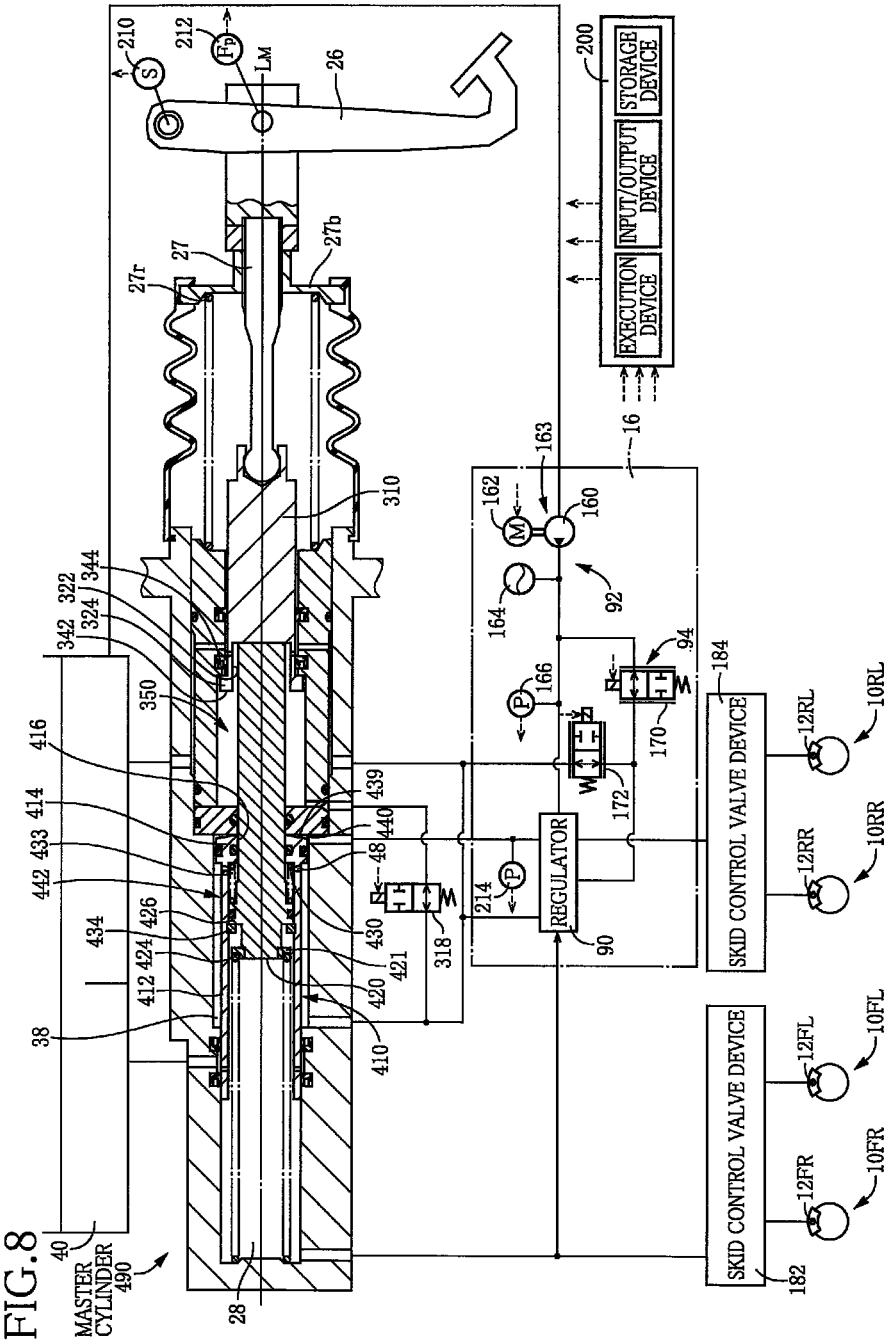
FIG. 8 is a view illustrating a hydraulic braking system including a master cylinder according to Embodiment 4 of the present invention, and the present hydraulic braking system includes a master cylinder device according to Embodiment 4 of the present invention.

In Embodiment 4, a hydraulic braking system includes a master cylinder 490. As illustrated in FIG. 8, the master cylinder 490 includes both of the input-piston-moving-away allowing engaging portion 350 of the master cylinder 300 according to Embodiment 2 and the engaging portion 442 of the master cylinder 400 according to Embodiment 3. In the present embodiment, the input-piston-moving-away allowing engaging portion 350 and the engaging portion 442 are combined with each other, achieving a desired relationship between the stroke of the first input piston 310 and the brake hydraulic pressure.

Embodiment 5

Figure 9:
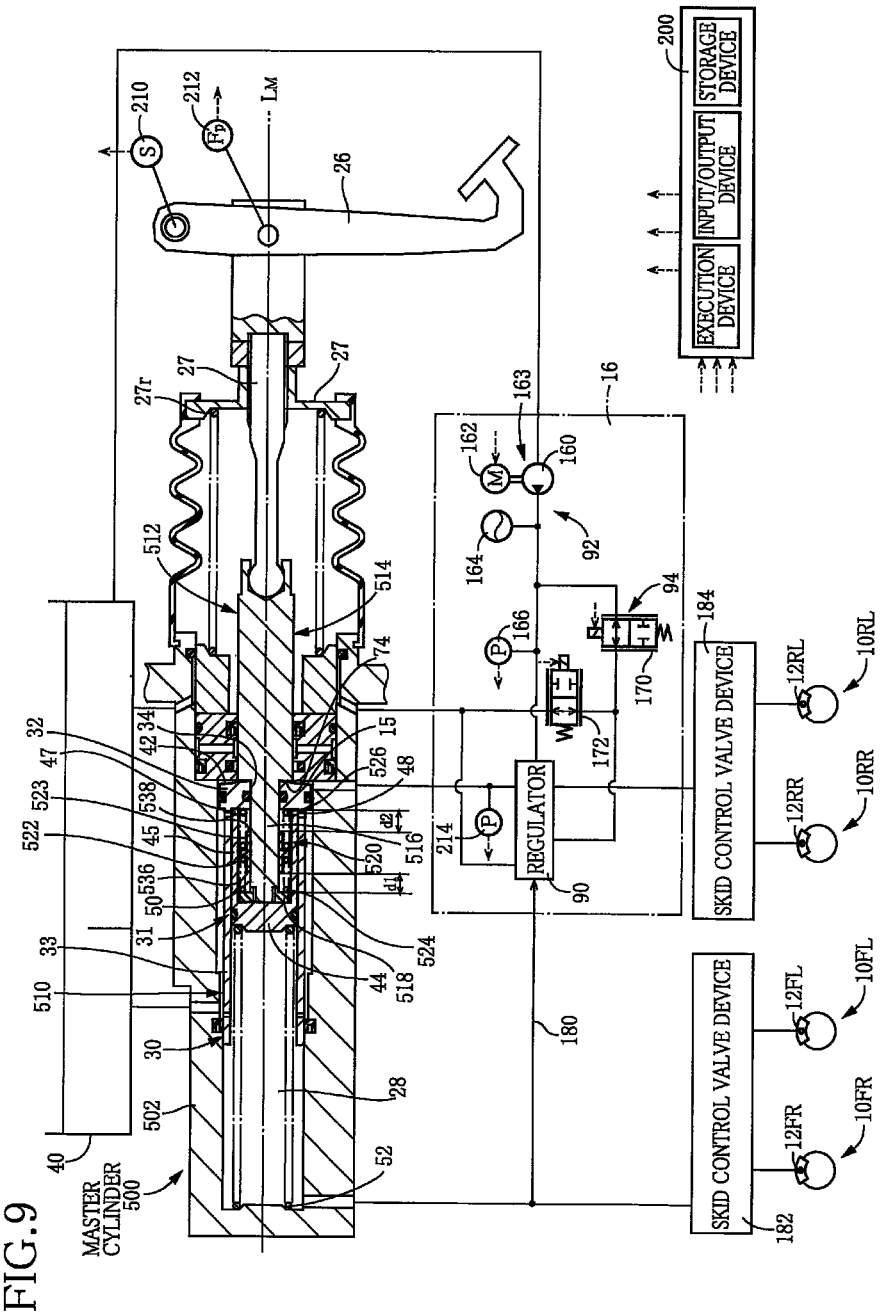
FIG. 9 is a view illustrating a hydraulic braking system including a master cylinder according to Embodiment 5 of the present invention, and the present hydraulic braking system includes a master cylinder device according to Embodiment 5 of the present invention.

In the present embodiment, as illustrated in FIG. 9, the hydraulic braking system includes a master cylinder 500 which differs from the master cylinder 14 of the hydraulic braking system in Embodiment 1 in engaging portion. The other structure of the master cylinder 500 is generally the same as that of the master cylinder 14, the same reference numerals as used in Embodiment 1 are used to designate the corresponding elements of this embodiment, and an explanation of which is dispensed with.

In the master cylinder 500, an output piston 510 and an input piston 512 are fluid-tightly and slidably fitted in a housing 502. Like the output piston 24 of the master cylinder 14 according to Embodiment 1, the output piston 510 includes the large-diameter piston member 30 and the small-diameter piston member 31 each having a blind cylinder shape which are arranged one inside another in the radial direction in the state in which the bottom portions 32, 44 face each other. The same reference numerals as used in the output piston 510 in Embodiment 1 are used to designate the corresponding elements of the output piston 510 in this embodiment, and an explanation of which is dispensed with.

The input piston 512 having a stepped shape includes a large diameter portion 514 and a small diameter portion 516 located on a front side of the large diameter portion 514. The small diameter portion 516 extends through the axial direction hole 34 and is located in the volume chamber 50. A front portion of the small diameter portion 516 is provided with a retainer member 518, and an annular retainer 520 is fitted on an intermediate portion of the small diameter portion 516 so as to be relatively movable in the axial direction. The annular retainer 520 includes: a protruding portion 522 protruding in the radial direction; and cylindrical portion 523 extending from the protruding portion 522 toward opposite sides thereof in the axial direction.

A first engaging spring 524 is provided between the retainer member 518 of the input piston 512 and a front portion of the protruding portion 522 of the annular retainer 520. A second engaging spring 526 is provided between a rear portion of the protruding portion 522 and the front portion of the bottom portion 32 of the output piston 510. A spring constant ks of the first engaging spring 524 is smaller than a spring constant kh of the second engaging spring 526 (kh>ks), and accordingly the first engaging spring 524 is compressed more easily than the second engaging spring 526.

The annular retainer 520 includes a cylindrical portion 533. Each of a front end face 536 and a rear end face 538 of the cylindrical portion 533 in its axial direction serves as a stopper. Contact of the front end face 536 of the annular retainer 520 with the retainer member 518 defines a limit of compression of the first engaging spring 524, and contact of the rear end face 538 of the annular retainer 520 with the bottom portion 32 of the output piston 510 defines a limit of compression of the second engaging spring 526.

In the present embodiment, in the annular retainer 520, a distance d1 between the retainer member 518 and the front end face 536 is shorter than a distance d2 between the rear end face 538 and the bottom portion 32 (d1<d2).

In the case where the two springs different from each other in spring constant k are arranged in line, the spring having the smaller spring constant is compressed more easily. Thus, in the case where a low hydraulic pressure is applied to the bottom portion 32 of the output piston 510, the first engaging spring 524 is mainly deformed, and thereafter the second engaging spring 526 is deformed.

In the hydraulic braking system constructed as described above, when the brake pedal 26 is depressed, the adjusted hydraulic pressure is supplied from the adjusted-hydraulic-pressure supply device 16 to the rear chamber 15. When a forward force acting on the output piston 510 exceeds the set load of the return spring 52, the output piston 510 is moved forward relative to the input piston 512. The annular retainer 520 is moved in the forward direction with little compression of the second engaging spring 526, and the first engaging spring 524 is mainly compressed. The output piston 510 is thereafter moved forward relatively while compressing the second engaging spring 526. The first engaging spring 524 is compressed until the front end face 536 of the annular retainer 520 is brought into contact with the retainer member 518, while the second engaging spring 526 is compressed until the front side face of the bottom portion 32 of the output piston 510 is brought into contact with the rear end face 538 of the annular retainer 520. That is, the output piston 510 is brought into contact with the input piston 512 via the annular retainer 520 in the axial direction in a state in which the first engaging spring 524 and the second engaging spring 526 are compressed to their respective maximum limits, and the output piston 510 and the input piston 512 are moved forward together by the braking operation force and the hydraulic pressure in the rear chamber 15.

Figure 10:
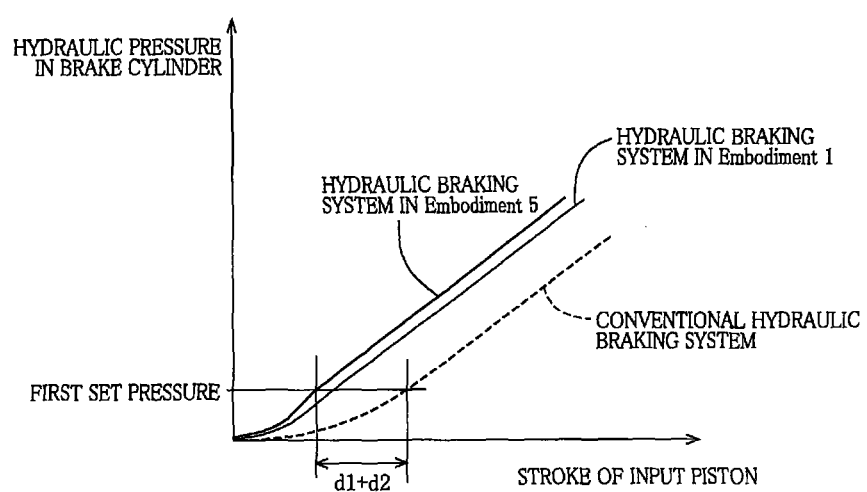
FIG. 10 is a view illustrating a relationship between a stroke of an input rod and a hydraulic pressure in a brake cylinder provided for a front wheel in the hydraulic braking system.

In the present embodiment, the relationship between the stroke of the input piston 22 and the brake hydraulic pressure changes as indicated by the bold line in FIG. 10. When the hydraulic pressure is supplied to the rear chamber 15, the first engaging spring 524 is mainly compressed first. In the case where the first and second engaging springs 524, 526 have the same set load, the second engaging spring 526 should have been compressed, too. However, in the case where an amount of compression of the second engaging spring 526 is considerably smaller than that of compression of the first engaging spring 524, the amount of compression of the second engaging spring 526 can be ignored. When the hydraulic pressure in the rear chamber 15 is thereafter increased, the second engaging spring 526 is also compressed.

In this case, since the spring constant of the second engaging spring 526 is larger than the spring constant of the first engaging spring 524, an increase gradient of the brake hydraulic pressure with respect to a stroke of the output piston 510 relative to the input piston 22 is larger in the case where the second engaging spring 526 is compressed than in the case where the first engaging spring 524 is compressed.

It is noted that the first and second engaging springs 524, 526 may have different set loads and may have different spring constants and different set loads. In any case, design of the first and second engaging springs 524, 526 can achieve a desired relationship between the stroke of the input piston 512 and the hydraulic pressure in the pressure chamber 28.

Three or more engaging springs may be arranged in line between the output piston 510 and the input piston 512.

Embodiment 6

Figure 11:
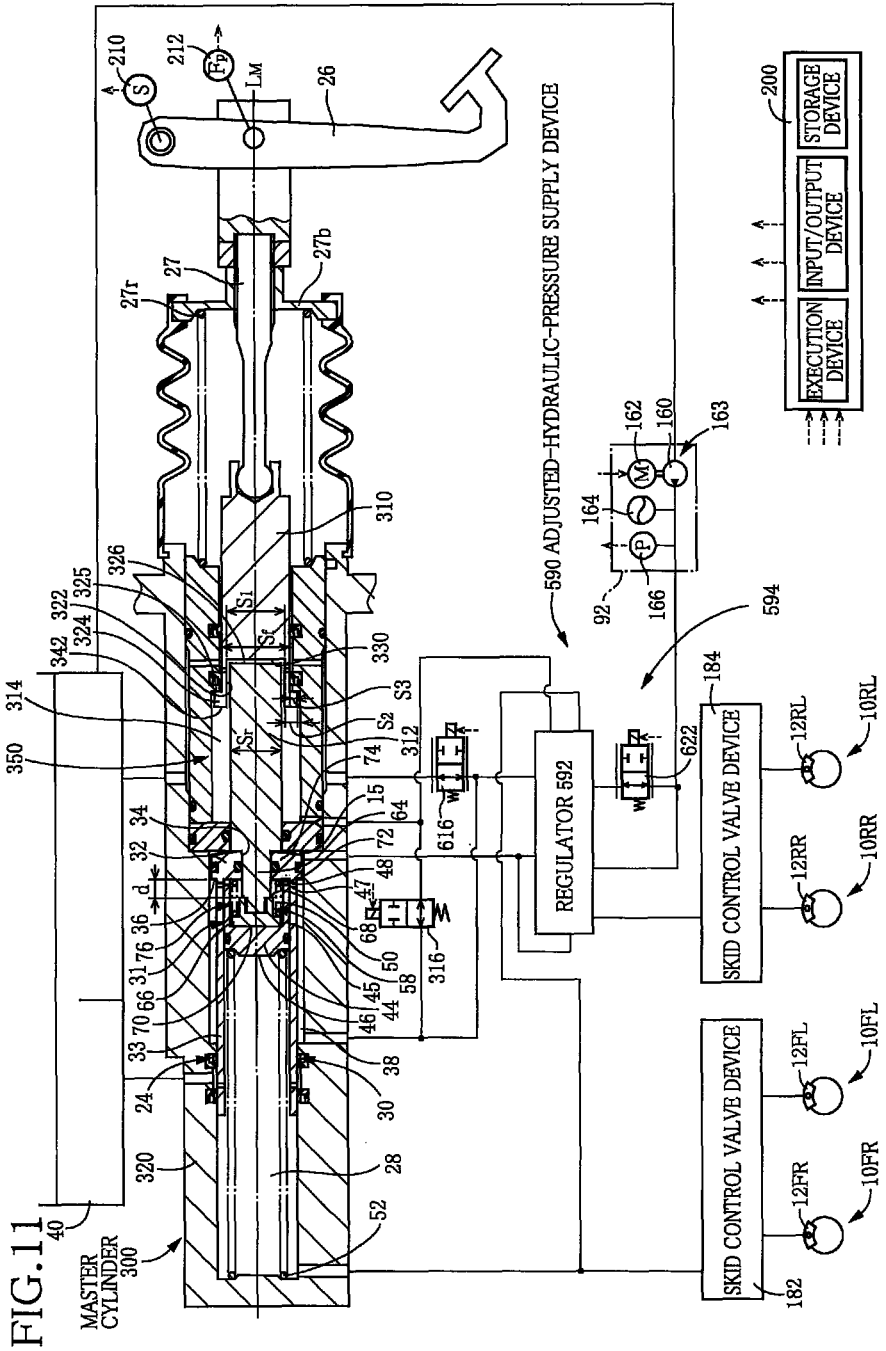
FIG. 11 is a view illustrating a hydraulic braking system including a master cylinder according to Embodiment 6 of the present invention, and the present hydraulic braking system includes a master cylinder device according to Embodiment 6 of the present invention.
Figure 12:
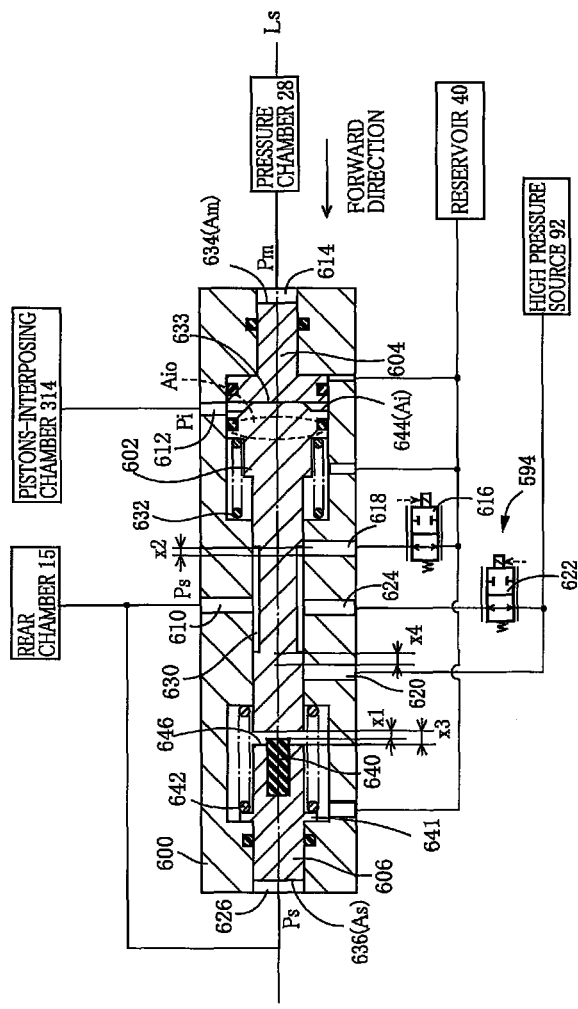
FIG. 12 is a view illustrating an adjusted pressure supply device of the master cylinder device.

The adjusted-hydraulic-pressure supply device is not limited to the adjusted-hydraulic-pressure supply devices in Embodiments 1-5 and may have a structure illustrated in FIGS. 11 and 12. In the present embodiment, an adjusted-hydraulic-pressure supply device 590 is applied to the master cylinder device according to Embodiment 2. Since the elements other than the adjusted-hydraulic-pressure supply device 590 are the same as those in Embodiment 2, and an explanation of which is dispensed with.

The adjusted-hydraulic-pressure supply device 590 includes a regulator 592, the high pressure source 92, and a linear valve device 594. As illustrated in FIG. 12, the regulator 592 can use the hydraulic pressure provided by the high pressure source 92 to control the adjusted hydraulic pressure to be supplied to the rear chamber 15, to a magnitude related to an operating force acting on the brake pedal 26 (hereinafter may be abbreviated as "braking operation force").

The regulator 592 includes a housing 600; a spool 602 slidably fitted in the housing 600; a frontward-movement driving member 604 configured to apply a forward force to the spool 602; and a rearward-movement driving member 606 configured to apply a backward force. The spool 602, the frontward-movement driving member 604, and the rearward-movement driving member 606 are arranged on the same axis (Ls) so as to be movable relative to each other.

The housing 600 has: an output port 610 to which the rear chamber 15 is connected; an input port 612 to which the pistons-interposing chamber 314 is connected; a master pressure port 614 to which the pressure chamber 28 is connected; a low pressure port 618 to which the reservoir 40 is connected via a pressure-reduction linear valve 616; a high pressure port 620 to which the high pressure source 92 is connected; a linear pressure port 624 to which the high pressure source 92 is connected via a pressure-increase linear valve 622; and a feedback pressure port 626 to which the rear chamber 15 is connected, and these ports are spaced apart from each other in the radial direction or the direction of the axis (Ls).

An outer circumferential portion of an intermediate portion of the spool 602 has an annular communication groove 630 extending in the direction of the axis (Ls). The position and the size of the communication groove 630 are determined such that the output port 610 and the linear pressure port 624 are always open, the low pressure port 618 is open at a back end position of the spool 602, and the high pressure port 620 is open at a forward end position of the spool 602. When the spool 602 is moved relative to the housing 600, one of the low pressure port 618 and the high pressure port 620 is selectively communicates with the output port 610 to control a hydraulic pressure in the output port 610.

A return spring 632 is provided between the spool 602 and the housing 600 to urge the spool 602 in the backward direction. A rear end face 633 of the spool 602 receives a hydraulic pressure in the input port 612.

The frontward-movement driving member 604 is disposed at a rear of the spool 602 and has a rear end face 634 which receives a hydraulic pressure in the master pressure port 614. The frontward-movement driving member 604 is movable forward by a forward force caused by the hydraulic pressure in the master pressure port 614, and applies the forward force caused by the master pressure, to the spool 602. The frontward-movement driving member 604 having a stepped shape includes a small diameter portion and a large diameter portion, and a step between the small diameter portion and the large diameter portion is brought into contact with the housing 600 to determine a back end position of the frontward-movement driving member 604. In this state, a front end face of the frontward-movement driving member 604 has a function as a stopper which determines the back end position of the spool 602.

The rearward-movement driving member 606 is disposed in front of the spool 602 with a space therebetween and has a front end face 636 which receives a hydraulic pressure in the feedback pressure port 626. An elastic member 640 formed of, e.g., rubber is provided on a rear portion of the rearward-movement driving member 606 (a rear portion of a main body). A stopper-function-provided retainer 641 protruding in the radial direction is provided on an intermediate portion of the rearward-movement driving member 606. The stopper-function-provided retainer 641 is brought into contact with the housing 600 to determine a forward end position of the rearward-movement driving member 606. A return spring 642 is provided between the stopper-function-provided retainer 641 and the housing 600 to urge the rearward-movement driving member 606 in the forward direction. A set load Fset of the return spring 642 is relatively large. The rearward-movement driving member 606 is movable rearward by a backward force having a magnitude obtained by subtracting an elastic force of the return spring 642 from the hydraulic pressure in the feedback pressure port 626, and the rearward-movement driving member 606 applies the backward force to the spool 602.

It is noted that when the spool 602, the frontward-movement driving member 604, and the rearward-movement driving member 606 are fluid-tightly fitted in the housing 600, the master pressure port 614, the input port 612, and the pilot pressure port 626 are fluid-tightly closed.

The area Aio is the area of the rear end face 633 of the spool 602. The area Ai is the area of a portion 644 which is a portion of the rear end face 633 other than its portion contactable with the frontward-movement driving member 604 (i.e., the area of an annular portion or the area of the portion which receives the hydraulic pressure in the input port 612 in a state in which the spool 602 and the frontward-movement driving member 604 are held in contact with each other). The area Am is the area of the rear end face 634 of the frontward-movement driving member 604. The area As is the area of the front end face 636 of the rearward-movement driving member 606.

In the state in which the spool 602 is located at its back end position, and the rearward-movement driving member 606 is located at its forward end position, the following relationships are established: a clearance x1 formed between a rear end face of the elastic member 640 provided on the rearward-movement driving member 606 and a front end face of the spool 602 is longer than or equal to a distance x2 between a rear end face of the communication groove 630 and a low pressure port 614 (x1≥x2); a clearance x3 formed between a rear end face 646 of the main body of the rearward-movement driving member 606 and the front end face of the spool 602 is longer than or equal to a distance x4 between a front end face of the communication groove 630 of the spool 602 and a high pressure port 612 (x3≥x4); and the distance x1 is shorter than or equal to the distance x4 (x1≤x4).

These distances x1-x4 are determined such that, at the same time or before the front end face of the spool 602 is brought into contact with the rear end face 646 of the main body of the rearward-movement driving member 606, the spool 602 is movable to a pressure increasing position for establishing communication between the output port 610 and the high pressure port 620 via the communication groove 630, and the spool 602 and the elastic member 640 are brought into contact with each other at the pressure increasing position. The elastic member 640 may be elastically deformed at the pressure increasing position in some cases, and thereby the spool 602 may be held in contact with the rear end face 646 of the main body of the rearward-movement driving member 606.

As described above, the linear valve device 594 includes: the pressure-increase linear valve 622 provided between the high pressure source 92 and the linear pressure port 624; and the pressure-reduction linear valve 616 provided between the low pressure port 618 and the reservoir 40. Each of the pressure-increase linear valve 622 and the pressure-reduction linear valve 616 is capable of controlling a high-low pressure differential to a magnitude related to an amount of current supplied to a solenoid. Each of the pressure-increase linear valve 622 and the pressure-reduction linear valve 616 is a normally open valve which is kept in its open state when no current is supplied to the solenoid. The linear valve device 594 is used in the case where automatic braking is actuated such as traction control and cruising control (following-distance control), and the pressure-increase linear valve 622 is kept closed, and the pressure-reduction linear valve 616 is kept open in the operating state of the brake pedal 26.

There will be next explained operations of the present hydraulic braking system.

When the brake pedal 26 is depressed, the communication cut-off valve 316 is switched to the closed state. The forward movement of the input piston 22 isolates the pistons-interposing chamber 314 from the reservoir 40, thereby generating a hydraulic pressure. The hydraulic pressure in the pistons-interposing chamber 314 is supplied to the regulator 592.

Figure 13:
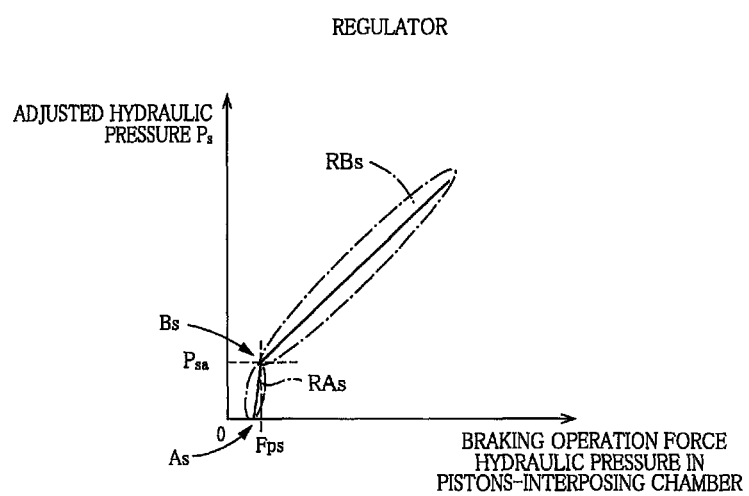
FIG. 13 is a view illustrating a relationship between an adjusted hydraulic pressure and a braking operation force in the adjusted pressure supply device.

In the regulator 592, the hydraulic pressure in the pistons-interposing chamber 314 is supplied from the input port 612, and the forward force is applied to the spool 602. When the forward force exceeds a set load of the return spring 632, the spool 602 is moved forward relative to the frontward-movement driving member 604. The output port 610 is isolated from the low pressure port 618 and fluidically coupled with the high pressure port 620, which starts a supply of a hydraulic pressure to the rear chamber 15 (the point As in FIG. 13). Since the high pressure port 620 communicates with the output port 610, the hydraulic pressure in the rear chamber 15 is increased with a large gradient in the region RAs in FIG. 13. A position of the spool 602 at which the output port 610 and the high pressure port 620 communicate with each other is referred to as "pressure increasing position".

Since the relationships "x1≥x2", "x3≥x4", "x4≥x1" are established as described above, when the forward force acting on the spool 602 becomes larger than or equal to the sum (F1+F2) of a force F1 which can elastically deform the return spring 632 by the displacement amount x4 and a force F2 which can elastically deform the elastic member 640 by a displacement amount (x4−x1), the spool 602 is moved to the pressure increasing position (noted that the force F2 is zero in the case of "x4=x1"). At the pressure increasing position, the spool 602 is held in contact with the elastic member 640.

In the present embodiment, since the set load and the spring constant of the return spring 632 and the set load and the spring constant of the elastic member 640 are small, the spool 602 is moved to the pressure increasing position in the case where the forward force acting on the spool 602, i.e., the hydraulic pressure in the pistons-interposing chamber 314 (which corresponds to the braking operation force) is small.

When the spool 602 is located at the pressure increasing position, a backward force Fb is applied to the rearward-movement driving member 606 by a hydraulic pressure Ps in the rear chamber 15. The backward force Fb is expressed by the following equation:

$$Fb = Ps \cdot As - Pi \cdot Aio \quad (1)$$

In this equation, the hydraulic pressure Pi is the hydraulic pressure in the pistons-interposing chamber 314. Since the spool 602 and the elastic member 640 (the rearward-movement driving member 606) are held in contact with each other, a forward force caused by the hydraulic pressure in the input port 612 is applied to the rearward-movement driving member 606 via the spool 602.

When the backward force Fb acting on the rearward-movement driving member 606 exceeds the set load Fset of the return spring 642 (Fb>Fset), the rearward-movement driving member 606 is moved in the backward direction, thereby moving the spool 602 backward. The high pressure port 620 is disconnected from the communication groove 630, and the high pressure port 620 is isolated from the output port 610 (the point Bs in FIG. 13). A hydraulic pressure Psa in the rear chamber 15 at this time point is expressed in the following equation:

$$Psa = (F\text{sets} + Pi \cdot Aio)/As \quad (2)$$

The braking operation force Fps at this time point has a magnitude related to the hydraulic pressure Pi in the pistons-interposing chamber 314.

When the hydraulic pressure in the pressure chamber 28 is thereafter increased, and a hydraulic pressure Pm supplied to the master pressure port 614 is increased, the frontward-movement driving member 604 is moved forward and brought into contact with the spool 602. In a state in which the spool 602, the frontward-movement driving member 604, and the rearward-movement driving member 606 (the elastic member 640) are held in contact with each other, a force expressed in the following equation is applied to the spool 602:

$$Ps \cdot As - (Ks \cdot \Delta + F\text{sets}) = Ps \cdot Ai + Pm \cdot Am \quad (4)$$

In this equation, "Pm" denotes the hydraulic pressure in the pressure chamber 28, "Ks" denotes the elastic modulus of the return spring 642, and "Δ" denotes an amount of displacement of the return spring 642. The spool 602 is moved in the direction of the axis Ls in a state in which the backward force on the left side and the forward force on the right side are balanced with each other in the above-described equation. This movement causes the output port 610 to communicate selectively with one of the high pressure port 620 and the low pressure port 618. As a result, an increase gradient of the servo pressure Ps with respect to a braking operation force Fp (corresponding to the hydraulic pressure Pi in the pistons-interposing chamber 314 and the hydraulic pressure Pm in the pressure chamber 28) is smaller in the region RBs in FIG. 13 than in the region RAs.

In the regulator 592 described above, the hydraulic pressure in the rear chamber 15 can be quickly increased in the initial period of the braking operation. As a result, the output piston 24 can be quickly moved forward relative to the second input piston 312 without control for the linear valve device 594.

It is to be understood that the invention is not limited to the details of the illustrated embodiments, but may be embodied with various changes and modifications, which may occur to those skilled in the art, without departing from the spirit and scope of the invention. For example, any structure may be employed for the hydraulic brake circuit.

EXPLANATION OF REFERENCE NUMERALS

14: Master Cylinder, 15: Rear Chamber, 16, 590: Adjusted-hydraulic-pressure Supply Device, 22: Input Piston, 24: Output Piston, 26: Brake Pedal, 32: Bottom Portion, 66: Retainer, 68: Stopper, 72: Engaging Spring, 74: Rear Hydraulic Pressure Receiving Face, 76: Engaging Portion, 90, 592: Regulator, 300: Master Cylinder, 310: First Input Piston, 312: Second Input Piston, 316: Communication Cut-off Valve, 326: Rear End Face, 314: Pistons-interposing Chamber, 350: Input-piston-moving-away Allowing Engaging Portion, 400: Master Cylinder, 414: Bottom Portion, 418: Input Piston, 424: Return Spring, 430: Engaging Spring, 432: Stopper, 442: Engaging Portion, 490: Master Cylinder, 500: Master Cylinder, 520: Annular Retainer, 524: First Engaging Spring, 526: Second Engaging Spring, 536: Front End Face, 538: Rear End Face

The invention claimed is:

1. A master cylinder, comprising:
   an input piston configured to be moved forward due to an operation of a braking operation member;
   an output piston provided on an axis coaxially with the input piston and configured to be moved forward to increase a hydraulic pressure in a pressure chamber defined in front of the output piston; and
   an engaging portion configured to engage the input piston and the output piston with each other via at least one engaging member in a state in which forward movement of the output piston relative to the input piston in a direction of the axis is allowed,
   wherein a plurality of engaging springs as the at least one engaging member are provided between the output piston and the input piston and arranged in line, and at least two of the plurality of engaging springs differ from each other in at least one of spring constant and set load;
   wherein the input piston and the output piston are fitted telescopically to each other, and
   wherein the engaging portion comprises a telescopic fitting portion in which the input piston and the output piston are fitted telescopically to each other.

2. The master cylinder according to claim 1, further comprising a rear chamber defined at a rear of a pressure receiving face of the output piston,
   wherein the engaging portion comprises a rear-hydraulic-pressure-dependent forward movement allowing portion configured to use a hydraulic pressure in the rear chamber to allow the forward movement of the output piston relative to the input piston.

3. The master cylinder according to claim 1, wherein the engaging portion comprises a relative forward movement amount definer configured to define an amount of the forward movement of the output piston relative to the input piston.

4. The master cylinder according to claim 1, wherein at least a portion of the output piston is disposed in a state in which: the at least the portion is formed in a blind cylinder shape in which a rear portion of the at least the portion is a bottom portion, and a front portion of the at least the portion is a cylindrical portion; an axial direction hole extending in the direction of the axis is formed in a center of the bottom portion; the input piston extends through the axial direction hole fluid-tightly and slidably; and a front portion of the input piston is located on an inner circumferential side of the cylindrical portion of the output piston.

5. The master cylinder according to claim 1, wherein the engaging portion engages the output piston and the input piston with each other such that one of (a) a state in which the output piston is movable forward relative to the input piston and (b) a state in which the input piston and the output piston are movable forward together is allowed to be selectively established.

6. The master cylinder according to claim 1, wherein the engaging portion is configured to engage the input piston and the output piston with each other, in at least a portion of a period in which the input piston is moved from a back end position thereof to a forward end position thereof, in the state in which the forward movement of the output piston relative to the input piston is allowed.

7. The master cylinder according to claim 1, wherein the engaging portion is configured to engage the input piston and the output piston with each other, in at least a portion of a period extending from a time point when the input piston is located at a back end position thereof to a time point when a hydraulic pressure in the pressure chamber reaches a set pressure, in the state in which the forward movement of the output piston relative to the input piston is allowed.

8. A master cylinder device, comprising:
   the master cylinder according to claim 1;
   a rear chamber defined at a rear of the output piston of the master cylinder; and
   a rear hydraulic pressure control device configured to control a hydraulic pressure in the rear chamber,
   wherein the rear hydraulic pressure control device comprises (a) a power hydraulic pressure source configured to be activated by supply of electric power and capable of outputting a hydraulic pressure at high pressure and (b) a hydraulic pressure controller configured to use a hydraulic pressure provided by the power hydraulic pressure source, to bring the hydraulic pressure in the rear chamber closer to a target hydraulic pressure.

9. A master cylinder, comprising:
   an input piston configured to be moved forward due to an operation of a braking operation member;
   an output piston provided on an axis coaxially with the input piston and configured to be moved forward to increase a hydraulic pressure in a pressure chamber defined in front of the output piston; and
   an engaging portion configured to engage the input piston and the output piston with each other via at least one engaging member in a state in which forward movement of the output piston relative to the input piston in a direction of the axis is allowed,
   wherein the master cylinder comprises (a) an input-side return spring provided between the input piston and a housing, as a forward movement suppressing portion configured to apply a backward force to the input piton to suppress forward movement of the input piston which is caused by forward movement of the output piston and (b) an output-side return spring provided between the output piston and the housing, and
   wherein the engaging portion comprises at least one engaging spring, as the at least one engaging member, provided between the input piston and the output piston, and a set load of at least one of the at least one engaging spring is less than at least one of a set load of the input-side return spring and a set load of the output-side return spring;

wherein the input piston and the output piston are fitted telescopically to each other, and wherein the engaging portion comprises a telescopic fitting portion in which the input piston and the output piston are fitted telescopically to each other.

10. A master cylinder, comprising:

an input piston configured to be moved forward due to an operation of a braking operation member;

an output piston provided on an axis coaxially with the input piston and configured to be moved forward to increase a hydraulic pressure in a pressure chamber defined in front of the output piston; and an engaging portion configured to engage the input piston and the output piston with each other via at least one engaging member in a state in which forward movement of the output piston relative to the input piston in a direction of the axis is allowed, wherein the input piston comprises (a) a first input piston and (b) a second input piston, wherein the first input piston is located nearer to the braking operation member than the second input piston, and the second input piston is engaged with the output piston via the engaging portion and movable relative to the first input piston, and wherein a pistons-interposing chamber is interposed between the first input piston and the second input piston;

wherein the input piston and the output piston are fitted telescopically to each other, and wherein the engaging portion comprises a telescopic fitting portion in which the input piston and the output piston are fitted telescopically to each other.

* * * * *